(12) United States Patent
Sebastian

(10) Patent No.: US 9,172,748 B2
(45) Date of Patent: *Oct. 27, 2015

(54) DELTACASTING FOR OVERLAPPING REQUESTS

(71) Applicant: VIASAT, INC., Carlsbad, CA (US)

(72) Inventor: William B. Sebastian, Falmouth, MA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/288,188

(22) Filed: May 27, 2014

(65) Prior Publication Data

US 2015/0026241 A1 Jan. 22, 2015

Related U.S. Application Data

(63) Continuation of application No. 12/684,726, filed on Jan. 8, 2010, now Pat. No. 8,775,503.

(60) Provisional application No. 61/170,359, filed on Apr. 17, 2009, provisional application No. 61/144,363, filed on Jan. 13, 2009.

(51) Int. Cl.
*G06F 15/16* (2006.01)
*H04L 29/08* (2006.01)
(Continued)

(52) U.S. Cl.
CPC ............ *H04L 67/10* (2013.01); *H04L 12/1859* (2013.01); *H04L 12/1863* (2013.01); *H04L 12/1881* (2013.01); *H04L 12/1886* (2013.01);
(Continued)

(58) Field of Classification Search
USPC ........................................ 709/203, 231, 224
See application file for complete search history.

(56) References Cited

U.S. PATENT DOCUMENTS

| 5,408,470 A | 4/1995 | Rothrock |
| 5,740,367 A | 4/1998 | Spilo |

(Continued)

FOREIGN PATENT DOCUMENTS

| EP | 2536065 A2 | 12/2012 |
| WO | WO-01/61886 A2 | 8/2001 |

(Continued)

OTHER PUBLICATIONS

Frantzeskou et al., "Effective Identification of Source Code Authors Using Byte-Level Information," ICSE '06, May 20-28, 2006, Shanghai, China, ACM 1-59593-085-X/06/0005, XP040040085, pp. 893-896.

(Continued)

*Primary Examiner* — Philip B Tran
(74) *Attorney, Agent, or Firm* — Marsh Fischmann & Breyfogle LLP; Daniel J. Sherwinter

(57) ABSTRACT

Methods, apparatuses, and systems are provided for improving utilization of a communications system (e.g., a satellite communications system) when handling overlapping content requests. Embodiments use various techniques (e.g., dictionary coding techniques) to create fingerprints of content traversing the links of the communications system. These fingerprints are used to identify and exploit opportunities for using multicasting to share forward-link capacity by collapsing multiple overlapping requests for the same content via multiple content session streams into fewer session streams, including one or more shared session streams.

20 Claims, 11 Drawing Sheets

(51) Int. Cl.
*H04L 12/18* (2006.01)
*H04L 29/06* (2006.01)
*H04L 12/911* (2013.01)

(52) U.S. Cl.
CPC ............... *H04L 47/70* (2013.01); *H04L 65/60* (2013.01); *H04L 67/42* (2013.01)

(56) References Cited

U.S. PATENT DOCUMENTS

| | | | |
|---|---|---|---|
| 5,870,754 | A | 2/1999 | Dimitrova et al. |
| 5,905,981 | A | 5/1999 | Lawler |
| 6,178,461 | B1 | 1/2001 | Chan et al. |
| 6,182,133 | B1 | 1/2001 | Horvitz |
| 6,339,787 | B1 | 1/2002 | Yohe et al. |
| 6,701,316 | B1 | 3/2004 | Li et al. |
| 6,879,808 | B1 | 4/2005 | Nations et al. |
| 7,124,305 | B2 | 10/2006 | Margolus et al. |
| 7,130,890 | B1 | 10/2006 | Kumar et al. |
| 7,340,510 | B1 | 3/2008 | Liskov et al. |
| 7,359,956 | B2 | 4/2008 | Kanai et al. |
| 7,430,331 | B2 | 9/2008 | Singh |
| 7,509,667 | B1 | 3/2009 | Cook |
| 7,636,767 | B2 | 12/2009 | Lev-Ran et al. |
| 7,680,897 | B1 | 3/2010 | Carter et al. |
| 7,681,032 | B2 | 3/2010 | Peled et al. |
| 7,716,367 | B1 | 5/2010 | Leighton et al. |
| 7,778,438 | B2 | 8/2010 | Malone |
| 7,814,149 | B1 | 10/2010 | Stringham |
| 7,836,177 | B2 | 11/2010 | Kasriel et al. |
| 7,917,531 | B2 | 3/2011 | Sakurai et al. |
| 7,941,409 | B2 | 5/2011 | Mimatsu |
| 7,953,881 | B1 | 5/2011 | Vadlakonda et al. |
| 8,010,705 | B1 | 8/2011 | Sebastian et al. |
| 8,041,677 | B2 | 10/2011 | Sumner et al. |
| 8,055,616 | B2 | 11/2011 | Johnston et al. |
| 8,082,228 | B2 | 12/2011 | Mu |
| 8,151,004 | B1 | 4/2012 | Ufimtsev et al. |
| 8,230,059 | B1 | 7/2012 | Santos et al. |
| 8,230,461 | B1 | 7/2012 | Ledermann et al. |
| 8,284,773 | B1 | 10/2012 | Woleben et al. |
| 8,477,635 | B2 | 7/2013 | Sebastian et al. |
| 8,489,672 | B2 | 7/2013 | Sebastian et al. |
| 8,489,673 | B2 | 7/2013 | Sebastian et al. |
| 8,639,744 | B2 | 1/2014 | Sebastian |
| 8,671,223 | B1 | 3/2014 | Sebastian et al. |
| 8,775,503 | B2 * | 7/2014 | Sebastian ............... 709/203 |
| 2001/0016836 | A1 | 8/2001 | Boccon-Gibod et al. |
| 2001/0043600 | A1 | 11/2001 | Chatterjee et al. |
| 2002/0006116 | A1 | 1/2002 | Burkhart |
| 2002/0026478 | A1 | 2/2002 | Rodgers et al. |
| 2002/0154887 | A1 | 10/2002 | Lu |
| 2002/0188735 | A1 | 12/2002 | Needham et al. |
| 2002/0194473 | A1 | 12/2002 | Pope et al. |
| 2003/0018581 | A1 | 1/2003 | Bratton et al. |
| 2004/0205071 | A1 | 10/2004 | Uesugi et al. |
| 2005/0010870 | A1 | 1/2005 | Gu et al. |
| 2005/0033747 | A1 | 2/2005 | Wittkotter |
| 2005/0131903 | A1 | 6/2005 | Margolus et al. |
| 2005/0249231 | A1 | 11/2005 | Khan |
| 2006/0184960 | A1 | 8/2006 | Horton et al. |
| 2006/0253444 | A1 | 11/2006 | O'Toole et al. |
| 2006/0277257 | A1 | 12/2006 | Kromann et al. |
| 2006/0288072 | A1 | 12/2006 | Knapp et al. |
| 2007/0033408 | A1 | 2/2007 | Morten |
| 2007/0101074 | A1 | 5/2007 | Patterson |
| 2007/0111713 | A1 | 5/2007 | Silverbrook et al. |
| 2007/0116151 | A1 | 5/2007 | Thesling |
| 2007/0133554 | A1 | 6/2007 | Ederer et al. |
| 2007/0143484 | A1 | 6/2007 | Drouet et al. |
| 2007/0174246 | A1 | 7/2007 | Sigurdsson et al. |
| 2007/0220303 | A1 | 9/2007 | Kimura et al. |
| 2007/0256021 | A1 | 11/2007 | Prager et al. |
| 2007/0288518 | A1 | 12/2007 | Crigler et al. |
| 2008/0005086 | A1 | 1/2008 | Moore |
| 2008/0066182 | A1 | 3/2008 | Hickmott et al. |
| 2008/0144713 | A1 | 6/2008 | Kimmich et al. |
| 2008/0155614 | A1 | 6/2008 | Cooper et al. |
| 2008/0175239 | A1 | 7/2008 | Sistanizadeh et al. |
| 2008/0205396 | A1 | 8/2008 | Dakshinamoorthy et al. |
| 2008/0235739 | A1 | 9/2008 | Coebergh Van Den Braak |
| 2008/0256138 | A1 | 10/2008 | Sim-Tang |
| 2008/0263130 | A1 | 10/2008 | Michalowitz et al. |
| 2009/0037393 | A1 | 2/2009 | Fredricksen et al. |
| 2009/0049469 | A1 | 2/2009 | Small et al. |
| 2009/0055471 | A1 | 2/2009 | Kozat et al. |
| 2009/0055862 | A1 | 2/2009 | Knoller et al. |
| 2009/0060086 | A1 | 3/2009 | Kimmich et al. |
| 2009/0158318 | A1 | 6/2009 | Levy |
| 2009/0168795 | A1 | 7/2009 | Segel |
| 2009/0234809 | A1 | 9/2009 | Bluger et al. |
| 2009/0313329 | A1 | 12/2009 | Agrawal et al. |
| 2010/0058430 | A1 | 3/2010 | Jones et al. |
| 2010/0083322 | A1 | 4/2010 | Rouse |
| 2010/0177642 | A1 | 7/2010 | Sebastian et al. |
| 2010/0179984 | A1 | 7/2010 | Sebastian |
| 2010/0179986 | A1 | 7/2010 | Sebastian et al. |
| 2010/0179987 | A1 | 7/2010 | Sebastian et al. |
| 2010/0180046 | A1 | 7/2010 | Sebastian et al. |
| 2010/0185730 | A1 | 7/2010 | Sebastian |
| 2010/0281105 | A1 | 11/2010 | Sebastian |
| 2012/0039231 | A1 | 2/2012 | Suri et al. |
| 2012/0060121 | A1 | 3/2012 | Goldberg et al. |
| 2012/0072933 | A1 | 3/2012 | Moore |
| 2012/0320916 | A1 | 12/2012 | Sebastian |
| 2013/0282796 | A1 | 10/2013 | Sebastian et al. |
| 2013/0282863 | A1 | 10/2013 | Sebastian et al. |
| 2014/0029612 | A1 | 1/2014 | Sebastian et al. |
| 2014/0040353 | A1 | 2/2014 | Sebastian et al. |

FOREIGN PATENT DOCUMENTS

| | | |
|---|---|---|
| WO | WO-01/84777 A2 | 11/2001 |
| WO | WO-02/41527 A1 | 5/2002 |
| WO | WO-2007/051079 A2 | 5/2007 |
| WO | WO-2010/083214 A2 | 7/2010 |
| WO | WO-2010/083248 A2 | 7/2010 |

OTHER PUBLICATIONS

Paul et al., "Distributed caching with centralized control," Computer Communications, vol. 24, Issue 2, Feb. 1, 2001, pp. 256-268.

Selvakumar et al., "Implementation and comparison of distributed caching schemes," Computer Communications, vol. 24, Issues 7-8, Apr. 1, 2001, pp. 677-684.

International Search Report and Written Opinion mailed in International Application No. PCT/US2010/020897 on Aug. 16, 2010, 15 pgs.

International Preliminary Report on Patentability mailed in International Application No. PCT/US2010/020897 on Jul. 19, 2011, 10 pgs.

International Search Report and Written Opinion mailed in International Application No. PCT/US2010/020940 on Sep. 22, 2010, 15 pgs.

International Preliminary Report on Patentability mailed in International Application No. PCT/US2010/020940 on Jul. 19, 2011, 10 pgs.

Non-Final Office Action mailed in U.S. Appl. No. 12/651,909 on Feb. 1, 2012, 22 pgs.

Applicant-Initiated Interview Summary mailed in U.S. Appl. No. 12/651,909 on Apr. 16, 2012, 3 pgs.

Amendment and Response to Non-Final Office Action filed in U.S. Appl. No. 12/651,909 on Apr. 27, 2012, 14 pgs.

Final Office Action mailed in U.S. Appl. No. 12/651,909 on Jun. 22, 2012, 19 pgs.

Notice of Appeal and Pre-Appeal Brief Request for Review filed in U.S. Appl. No. 12/651,909 on Aug. 21, 2012, 6 pgs.

Notice of Panel Decision from Pre-Appeal Brief Review mailed in U.S. Appl. No. 12/651,909 on Sep. 28, 2012, 2 pgs.

Appeal Brief filed in U.S. Appl. No. 12/651,909 on Nov. 27, 2012, 28 pgs.

Examiner's Answer to Appeal Brief mailed in U.S. Appl. No. 12/651,909 on Jan. 31, 2013, 12 pgs.

(56) References Cited

OTHER PUBLICATIONS

Reply Brief filed in U.S. Appl. No. 12/651,909 on Mar. 29, 2013, 3 pgs.
Patent Trial and Appeal Board Docketing Notice mailed in U.S. Appl. No. 12/651,909 on Apr. 17, 2013, Appeal No. 2013-006223, 2 pgs.
Non-Final Office Action mailed in U.S. Appl. No. 13/517,860 on Mar. 25, 2014, 13 pgs.
Applicant-Initiated Interview Summary mailed in U.S. Appl. No. 13/517,860 on Jul. 21, 2014, 3 pgs.
Amendment and Response to Non-Final Office Action filed in U.S. Appl. No. 13/517,860 on Jul. 25, 2014, 13 pgs.
Non-Final Office Action mailed in U.S. Appl. No. 13/908,960 on Dec. 23, 2013, 6 pgs.
Response to Non-Final Office Action filed with Terminal Disclaimer in U.S. Appl. No. 13/908,960 on Mar. 24, 2014, 12 pgs.
Notice of Allowance mailed in U.S. Appl. No. 13/908,960 on Apr. 4, 2014, 7 pgs.
Notice of Allowance mailed in U.S. Appl. No. 13/908,960 on May 9, 2014, 7 pgs.
U.S. Appl. No. 13/919,861, filed Jun. 17, 2013, 98 pgs.
U.S. Appl. No. 13/919,888, filed Jun. 17, 2013, 63 pgs.
U.S. Appl. No. 14/046,781, filed Oct. 4, 2013, 63 pgs.
U.S. Appl. No. 14/070,977, filed Nov. 4, 2013, 38 pgs.
U.S. Appl. No. 14/453,479, filed Aug. 6, 2014, 77 pgs.

* cited by examiner

DELTACASTING FOR OVERLAPPING REQUESTS

CROSS-REFERENCES

This application is a continuation of U.S. application Ser. No. 12/684,726, titled "DELTACASTING FOR OVERLAPPING REQUESTS", filed on Jan. 8, 2010, which claims the benefit of U.S. Provisional Application Ser. No. 61/144,363, filed on Jan. 13, 2009, titled "SATELLITE MULTICASTING" and U.S. Provisional Application Ser. No. 61/170,359, filed on Apr. 17, 2009, titled "DISTRIBUTED BASE STATION SATELLITE TOPOLOGY," all of which are hereby expressly incorporated by reference in their entireties for all purposes.

This application is also related to U.S. application Ser. No. 12/651,909, filed on Jan. 4, 2010, titled "DELTACASTING," which is hereby expressly incorporated by reference in its entirety for all purposes.

BACKGROUND

This disclosure relates in general to communications and, but not by way of limitation, to multicast optimization over links of a communications system.

In some topologies of communications systems, groups of users share some or all of the forward link. For example, in some satellite communications systems, users share spot beams for communicating with a service provider (e.g., via a base station and/or gateway). Communication services provided to the users over the shared forward link may be affected by a number of factors, including bandwidth and other link conditions. For example, because all users sharing the forward link also share the link's bandwidth, any unnecessary redundancies in communications may cause sub-optimal utilization of the forward link.

As such, it may be desirable to optimize utilization of the shared forward link by minimizing redundancies.

SUMMARY

Among other things, methods, systems, devices, and software are provided for improving utilization of a communications system (e.g., a satellite communications system) when handling live content requests. Embodiments use various techniques (e.g., dictionary coding techniques) to create fingerprints of content traversing the links of the communications system. These fingerprints are used to identify and exploit opportunities for using multicasting to share forward-link capacity by collapsing multiple overlapping requests for the same content via multiple content session streams into fewer session streams, including one or more shared session streams.

In one set of embodiments, a method is provided for multicasting over a communications system having a communications path between a server side of the communications system and a plurality of clients, the communications path including a shared forward link over which bandwidth resources are shared during a multicast communication. The method includes intercepting traffic at the server side of the communications system, the traffic including a header portion and a content portion and being part of a first client session stream configured to communicate a content stream comprising the traffic to a first client over the communications path, the server side in communication with a global stream model configured to maintain models of active session streams being communicated over the communications path, one of the active session streams being a second client session stream currently communicating the content stream to a second client over the communications path so that an elapsed portion of the content stream has already been communicated to the second client and a remaining portion of the content stream has not yet been communicated to the second client substantially when the traffic is intercepted. The method further includes generating a fingerprint using byte-level information comprised by the content portion of the traffic; using the fingerprint to determine whether the traffic matches byte-level information comprised by the elapsed portion of the content stream communicated to the second client over the second client session stream according to the global stream model; and, when the traffic matches the byte-level information comprised by the elapsed portion of the content stream, configuring a shared session stream to multicast at least some of the remaining portion of the content stream from the server side of the communications system to the first client and the second client over the communications path substantially as the traffic is communicated to the first client over the first client session stream.

In some of these embodiments, after configuring the shared session stream, the method further includes intercepting shared traffic associated with the shared session stream at the server side of the communications system; and multicasting the shared traffic over the shared session stream to the first client and the second client. In others of these embodiments, after configuring the shared session stream, the method includes: intercepting shared traffic associated with the shared session stream at the server side of the communications system; generating a second fingerprint using byte-level information comprised by a content portion of the shared traffic; using the second fingerprint to determine whether the shared traffic has been previously communicated to the first client according to the client model; and, when the shared traffic has not been previously communicated to the first client according to the client model, multicasting the shared traffic over the shared session stream. In certain embodiments, when the shared traffic has been previously communicated to the first client according to the client model, the method may further include compressing the shared traffic using the client model; and unicasting the compressed shared traffic from the server side of the communications system to the first client over the communications path.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1A:
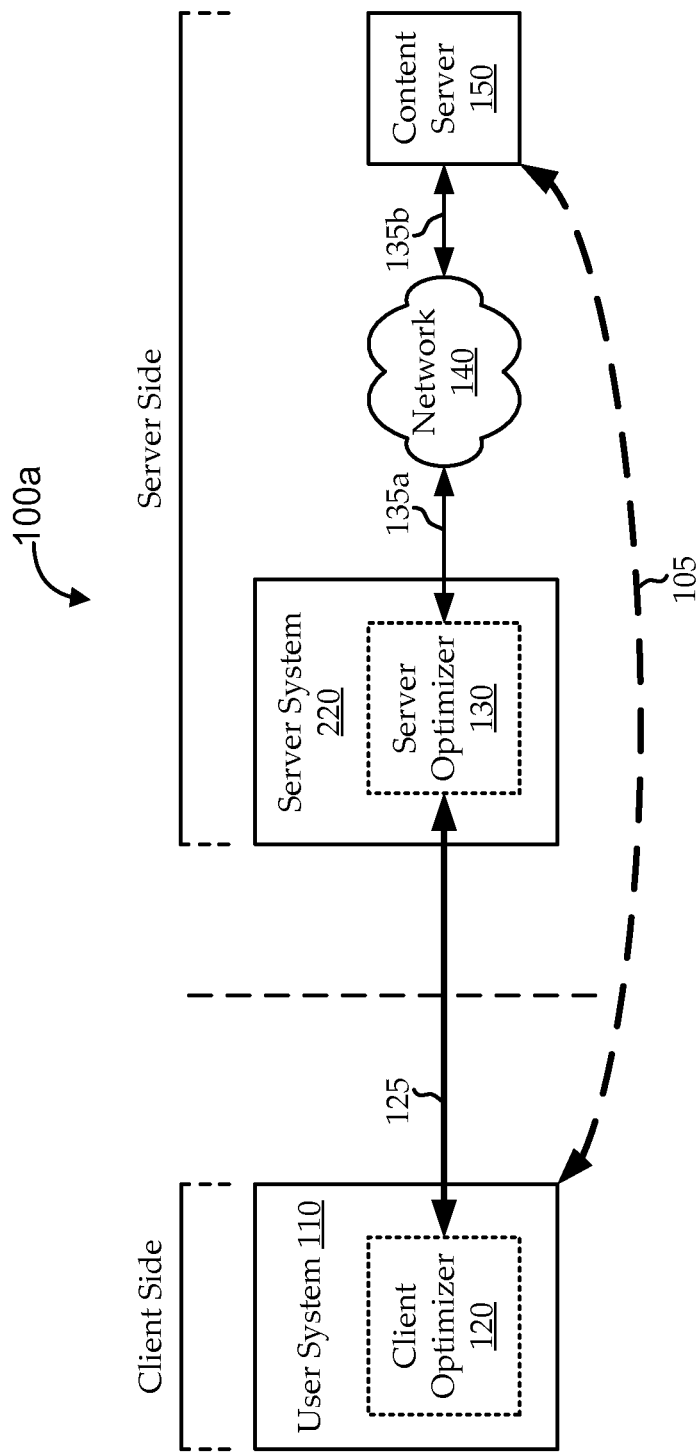
FIG. 1A shows a simplified block diagram of one embodiment of a communications system for use with various embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Among other things, methods, systems, devices, and software are provided for improving utilization of a communications system (e.g., a satellite communications system) when handling overlapping content requests. Embodiments use multicasting techniques to identify and exploit opportunities for sharing forward-link capacity when two users download substantially the same content at different, but overlapping times. In some embodiments, models are maintained for all active session streams on the communications system. When a user requests content (e.g., on-demand content), the response data is fingerprinted and compared against the stream models (e.g., according to "deltacasting" techniques described herein). If a match is found, the user may join the matching active stream and download the remaining portion of the content being multicast on that now-shared stream. The user may also download other portions of the requested content using one or more other session streams.

For example, a second user requests to watch (or otherwise download) an on-demand movie, half of which having already been communicated to a first user. The communication to the first user is reflected in the stream models and a match is identified with the new request from the second user. The second user may join the first user's session stream, sharing and storing data for the remaining half of the movie received on the shared stream as a multicast. At substantially the same time, the second user may watch the first half of the movie over another session stream.

In effect, embodiments identify the second half of the movie as an opportunity for sharing link capacity by communicating substantially identical content to multiple users at substantially the same time. In fact, a number of types of scenarios may exist in which substantially identical content is sent to multiple users at substantially the same time (e.g., accounting for jitter windows, asynchronicities, and/or other artifacts of the communications system). While similarities between these scenarios exist, handling of content streams in these scenarios may differ, depending on the types of requests involved.

In one type of scenario, users request "live" content, such as live broadcast television. "Live" content, as used herein, may include content which has a start time that is independent of the timing of a particular user request for the content. For example, live content may include any content being broadcast live or with some production delay, linearly scheduled television and radio content, live seminar or course webcasts for individuals or enterprises, and/or any other content that a user consumes from its current playback position (e.g., rather than from the beginning of the content). In some embodiments, whether content is "live" is determined with respect to each user. For example, a first user requests on-demand content, and begins to watch the content from the beginning. During playback, a second user requests to tune-in to the same content by joining the first user's playback experience. The content may not be considered "live" with respect to the first user, but the content may be considered "live" with respect to the second user.

In another type of scenario, multiple users request content at different, but overlapping times, and each desires to consume the content from a particular playback position (e.g., the beginning) irrespective of the current playback position with respect to other users. As used herein, "overlapping request" content includes any type of on-demand content, such as on-demand movies, content files, etc., where the desired "start time" for the content is dependent on the timing of the independent requests for the content.

In one illustrative example, a second user requests a movie while the movie is being watched by a first user. In the live content context, the second user would effectively tune into the first user's content stream, watching only the remainder of the movie along with the first user from the first user's current playback position. In the overlapping request content context, the second user may start watching the movie from the beginning (or some other designated location) while the first user continues to watch the movie from its current playback position. Meanwhile, the second user may receive the remainder of the movie being communicated to the first user, and store the content for later use (e.g., to provide high compression when the second user ultimately requests the locally stored content).

It will be appreciated that, in both types of scenario, a portion of the content communicated to the users is substantially identical. For example, in the live content context, embodiments use deltacasting techniques to collapse multiple, substantially identical live content session streams. In the overlapping request content context, embodiments use deltacasting techniques to identify and pre-position portions of requested content from other active session streams, while other portions of the content are being received and/or consumed by the requesting user. In either context, more efficient use of forward-link capacity may be achieved by identifying these types of opportunities for communicating content to multiple users at the same time, even where the content may ultimately be consumed at different times.

Some embodiments operate in a client-server context, in which the server-side of the communication link intercepts requests and responses as an optimizer (e.g., a proxy or in-line optimizer between a client web browser and an Internet content provider). The optimizer uses various techniques (e.g., dictionary coding techniques) to create fingerprints of content traversing the links of the communications system. These fingerprints are used to identify and exploit multicasting opportunities for increased utilization of the communication links. When multicasting opportunities are identified, client session streams may be effectively collapsed into a shared content stream carrying a content stream identifier and other relevant information. Use of fingerprints to identify and/or exploit multicasting opportunities is referred to herein as "deltacasting."

Referring first to FIG. 1A, a simplified block diagram is shown of one embodiment of a communications system 100a for use with various embodiments. The communications system 100a facilitates communications between a user system 110 and a content server 150 via a client optimizer 120, a server optimizer 130, and a network 140. The client optimizer 120 and the server optimizer 130 are configured to effectively provide an optimizer tunnel 105 between the user system 110 and the content server 150, including providing certain communications functionality.

Embodiments of the optimizer (e.g., the server optimizer 130, the client optimizer 120, and the resulting optimizer tunnel 105) can be implemented in a number of ways without departing from the scope of the invention. In some embodiments, the optimizer is implemented as a proxy, such that the server optimizer 130 is a proxy server, the client optimizer 120 is a proxy client, and the optimizer tunnel 105 is a proxy tunnel. For example, a transparent intercept proxy can be used to intercept traffic in a way that is substantially transparent to users at the client-side of the proxy tunnel. In other embodiments, the optimizer is implemented as an in-line optimizer. For example, the client optimizer 120 is implemented within a user terminal and the server optimizer 130 is implemented within a provider terminal (e.g., a satellite base station or gateway, a cable head-end, a digital subscriber line access multiplexer (DSLAM), etc.). Other configurations are possible in other embodiments. For example, embodiments of the server optimizer 130 are implemented in the Internet cloud (e.g., on commercial network leased server space). Embodiments of the client optimizer 120 are implemented within a user's personal computer, within a user's modem, in a physically separate component at the customer premises, etc.

It is worth noting that references herein to "intercepting" data should be construed broadly to include any useful slowing, sampling, re-routing, and/or other techniques that allow processing of the data as required according to various embodiments. In some embodiments, traffic passes through the server optimizer 130, where it is "intercepted" by being buffered for analysis and processing. For example, the buffering may be used to slow and accumulate traffic for fingerprint generation and analysis, as described more fully below. Notably, certain embodiments described as using an optimizer component (e.g., the server optimizer 130) to intercept the traffic may actually be implemented by having a different component intercept the traffic, from which the optimizer component may receive the intercepted traffic for processing.

Embodiments of the user system 110 may include any component or components for providing a user with network interactivity. For example, the user system 110 may include any type of computational device, network interface device, communications device, or other device for communicating data to and from the user. Typically, the communications system 100a facilitates communications between multiple user systems 110 and a variety of content servers 150 over one or more networks 140 (only one of each is shown in FIG. 1A for the sake of clarity). The content servers 150 are in communication with the server optimizer 130 via one or more networks 140. The network 140 may be any type of network 140 and can include, for example, the Internet, an Internet protocol ("IP") network, an intranet, a wide-area network ("WAN"), a local-area network ("LAN"), a virtual private network ("VPN"), the Public Switched Telephone Network ("PSTN"), and/or any other type of network 140 supporting data communication between devices described herein, in different embodiments. The network 140 may also include both wired and wireless connections, including optical links.

As used herein, "content servers" is intended broadly to include any source of content in which the users may be interested. For example, a content server 150 may provide website content, television content, file sharing, multimedia serving, voice-over-Internet-protocol (VoIP) handling, and/or any other useful content. It is worth noting that, in some embodiments, the content servers 150 are in direct communication with the server optimizer 130 (e.g., not through the network 140). For example, the server optimizer 130 may be located in a gateway that includes a content or application server. As such, discussions of embodiments herein with respect to communications with content servers 150 over the network 140 are intended only to be illustrative, and should not be construed as limiting.

In some embodiments, when the user system 110 communicates with the content server 150, the server optimizer 130 intercepts the communications for one or more purposes. As described below, the server optimizer 130 may be part of a server system 220 that includes components for server-side communications (e.g., base stations, gateways, satellite modem termination systems (SMTSs), digital subscriber line access multiplexers (DSLAMs), etc., as described below with reference to FIG. 2). The server optimizer 130 may act as a transparent and/or intercepting proxy. For example, the client optimizer 120 is in communication with the server optimizer 130 over a client-server communication link 125, and the server optimizer 130 is in communication with the content server 150 over a content network link 135. The server optimizer 130 may act as a transparent man-in-the-middle to intercept the data as it passes between the client-server communication link 125 and the content network link 135. Some purposes of the interception may include filtering, caching, parsing, and/or otherwise processing the requests and responses. For example, when the user system 110 requests a web object from a content server 150, the server optimizer 130 may intercept and parse the request to implement prefetching and/or other types of functionality.

As described more fully below, embodiments of the server optimizer 130 use various techniques (e.g., dictionary coding) to identify redundancies between incoming data and data previously sent across the links of the communications system 100a (e.g., the client-server communication link 125 and the content network link 135). In particular, various techniques (e.g. delta coding, wide dictionary coding, etc.) may allow identification of redundancies in byte sequences traversing the links even when a large history is maintained. These techniques may be used to identify and exploit opportunities for multicasting to increase utilization of the communications links. As discussed above, use of these techniques to identify and exploit these and other types of multicast opportunities is referred to herein as "deltacasting."

It will be appreciated that "delta coding," "dictionary coding," "dictionary," "deltacasting," and other similar terms and phrases are intended to be broadly construed to include use of any type of dictionary-like structure for optimization. Embodiments of the dictionary include chunks of content data (e.g., implemented as delta dictionaries, wide dictionaries, byte caches, and/or other types of dictionary structures). For example, when content data is stored in the dictionary, some or all of the blocks of data defining the content are stored in the dictionary in an unordered, but indexed way. As such, content may not be directly accessible from the dictionary; rather, the set of indexes may be needed to recreate the content from the set of unordered blocks.

It is worth noting that data may be communicated over a communications system 100a using one or more protocols that define, among other things, the format for the datagrams (e.g., packets, frames, etc.). Each datagram may typically include a header portion and a content portion. As used herein, the term "header" is intended broadly to include any portions of the datagram other than those used to communicate the actual content (e.g., file data), and is not intended to be limited to any particular datagram format. For example, an Internet protocol (IP) packet may include a header at the beginning of each packet, while other types of datagrams may provide header-types of information in other ways (e.g., using preambles, post-ambles, mid-ambles, spread-ambles, sub-frames, separate signaling or control data, etc.). These header portions may include information, such as source address, destination address, priority, packet length, coding information, modulation information, etc. Of course, those of skill in the art will appreciate that similar categories of header-portion and content-portion information may be found within datagrams of other protocol formats (e.g., HTTP, FTP, etc.).

Much can be gleaned from the header portions of data. For example, the header portion may include metadata or other information about the content portion that can be used to help characterize the content portion of the data. In fact, this technique may be used by certain types of content delivery systems, like a video-on-demand (VOD) system. A VOD system may include an application running at a VOD content server and/or at the end viewer's customer premises equipment (CPE) (e.g., on a set-top box) for parsing and translating proprietary metadata from packet headers of user requests. Notably, while use of the metadata may provide relatively straightforward knowledge of the content being requested, using proprietary tags in this way may require having access to (e.g., and running an application on) the content server.

For example, a parsed URL may look as follows: "http://www.VOD.com/movieplayer?70AX05nkd4868PR1D5g." The illustrative URL includes a string of characters generated as part of a proprietary application function, and may be decoded by the VOD server application to identify information, including the particular download requested, an identifier for the session, user or account data, shopping cart data, client playback capabilities, etc. As such, another request for the same VOD movie, even from the same content server, may have different URLs (e.g., different request headers). While the VOD application server may be able to understand the requests as being for the same movie (e.g., the VOD applications server will understand which bytes specify the content), a transparent intercept proxy, like that of embodiments of the server optimizer 130, may not be able to determine this from the metadata alone.

Embodiments of the server optimizer 130 generate fingerprints (e.g., fingerprints, digests, signatures, hash functions, etc.) from the content portion of the data traversing the communication links. The server optimizer 130 intercepts and analyzes the byte-level data of the content portion in a way that is substantially transparent to the user. Embodiments of the fingerprints are generated so as to be useful in identifying redundancies between the incoming intercepted data and previously processed data. For example, hashing functions are applied to traffic, after being intercepted by the server optimizer 130, for use as identifiers (e.g., "weak" identifiers) that are at least strong enough to identify candidate matches with blocks stored in a dictionary. Some embodiments of the fingerprints are generated so as to be useful further as strong identifiers for representing substantially identical matching blocks stored in a dictionary.

A number of difficulties arise from implementing this type of optimizer to use fingerprints (e.g., rather than metadata or other header information). In one example, as described above, header data (e.g., particularly proprietary metadata) may be used to make a number of determinations (e.g., precisely what object file is being requested) that may be difficult or impossible to make from the content data alone. In another example, proprietary data or limited content environments may allow certain assumptions to be made. For example, when someone requests a VOD movie, the server may know exactly what bytes are being requested (e.g., whatever bytes are associated with that particular movie file on the VOD server), how large the file is, that the viewer is likely to watch the movie sequentially, where the movie is stored, etc. However, by using the content portion of the data to generate fingerprints, embodiments of the server optimizer 130 are relatively agnostic to the content being analyzed, which may provide certain functionality even where the server optimizer 130 has little or no access to proprietary metadata and/or other header information.

In some embodiments, for example, the server optimizer 130 generates fingerprints of data being received over the content network link 135 in response to various requests from different users on a shared spot beam of a satellite communications system (e.g., where the requests are fulfilled by the server optimizer 130 over the client-server link 125 of the communications system 100a). The server optimizer 130 determines from the fingerprints that multiple users are requesting the same content at substantially the same time. In response, the server optimizer 130 creates a multicast service flow (e.g., on the client-server link 125) over which it multicasts the requested data to all the requesting users, thereby saving bandwidth relative to unicasting multiple copies of the content to the multiple users.

It is worth noting that embodiments of the client-server communication link 125 (e.g., between the client optimizer 120 and the server optimizer 130) and the content network link 135 (e.g., between the server optimizer 130 and the content servers 150 via the networks 140) can be implemented as various types of links have different and/or changing link characteristics, including, for example, differences in bandwidth, latency, cost per bit, etc. For example, while certain embodiments are described in the context of a satellite communications system, where the client-server communication link 125 includes at least one satellite link, other topologies and link types are possible.

Figure 1B:
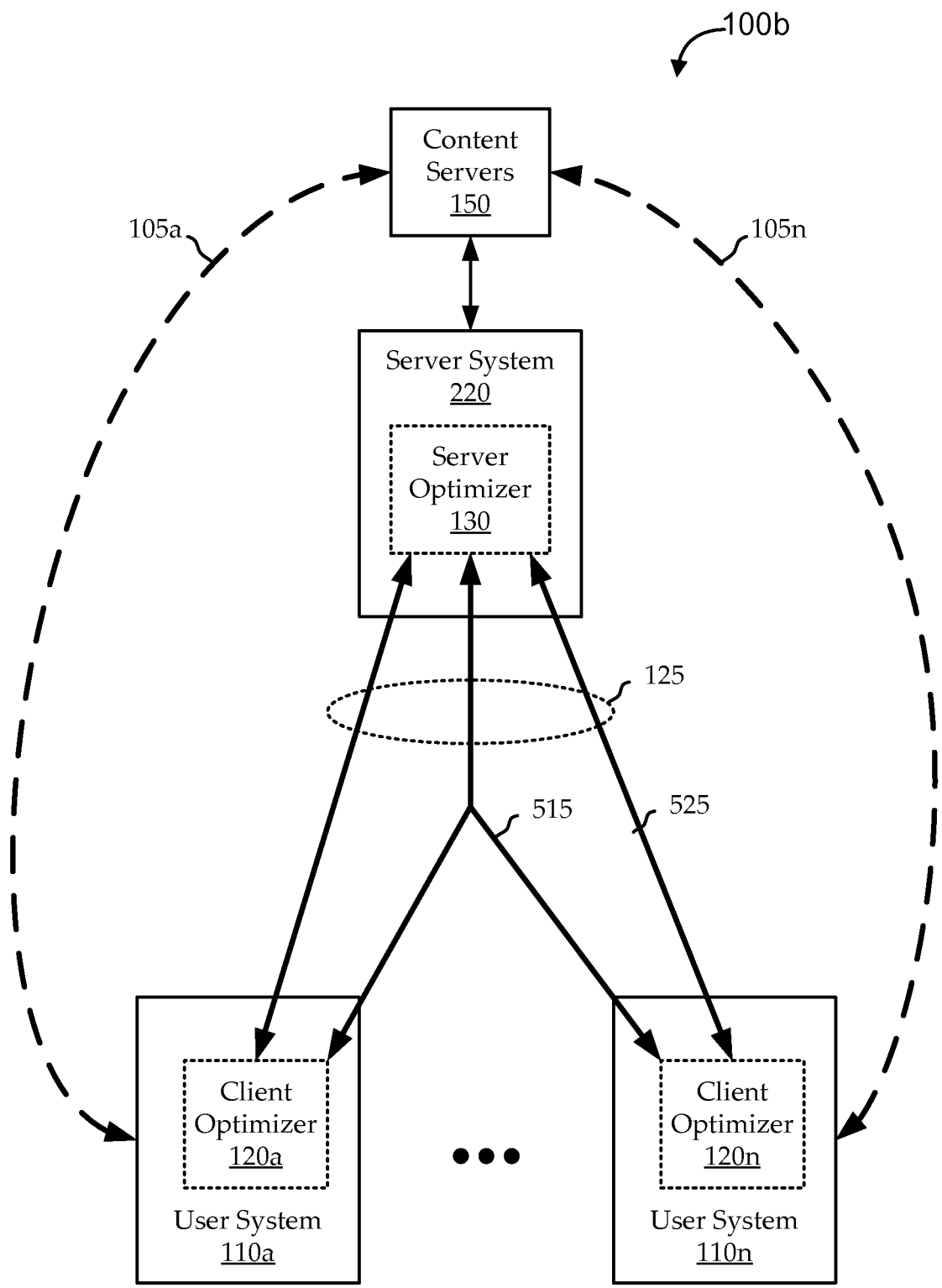
FIG. 1B shows a simplified block diagram of another embodiment of a communications system having multiple optimizer tunnels for use with various embodiments.

While the communications system 100a illustrated in FIG. 1A shows only one optimizer tunnel 105 between one server system 220 and one user system 110, embodiments typically operate in the context of, and take advantage of, multiple optimizer tunnels 105. FIG. 1B shows a simplified block diagram of another embodiment of a communications system 100b having multiple optimizer tunnels 105 for use with various embodiments. The communications system 100b facilitates communications between a server system 220 and multiple user systems 110, via a respective server optimizer 130 and multiple client optimizers 120. The client optimizers 120 and the server optimizer 130 are configured to effectively provide tunnels 105 between the user systems 110 and content servers 150.

A client-server communication link 125 between the server optimizer 130 and the client optimizers 120 supports one or more unicast service flows 525 and one or more multicast service flows 515 for supporting unicast and multicast traffic, respectively. In one embodiment, the client-server communication link 125 includes a satellite communications link. It will be appreciated that satellites may effectively broadcast all their downstream traffic to all receivers that are tuned to a particular carrier, beam, etc. As such, unicasting or multicasting to one or more user systems 110 may, in fact, involve broadcasting the data over the satellite link and also broadcasting control data to direct receivers to either accept or ignore relevant portions of the broadcast data. Notably, while some system resources may be expended in setting up a multicast service flow 515 and in related logistics, it "costs" the satellite communications system 100b substantially the same bandwidth resources to send a packet to one user system 110 or to all user systems 110 (e.g., on a particular spot beam).

Similarly, in another embodiment, the client-server communication link 125 includes a cable communications link. For example, a cable company may run a cable line to a neighborhood aggregator, from which individual coaxial lines communicate last mile traffic to individual households. Each individual coaxial cable may carry all the traffic for the entire neighborhood, even where some of that traffic is destined only for particular households. As in the satellite embodiment described above, since all the cable subscriber households in the same neighborhood effectively receive all the traffic, bandwidth resources can be shared by multicasting traffic, where appropriate. Of course, satellite and cable networks are only two illustrative embodiments of client-server communication links 125. Embodiments of the client-server communication link 125 can include any type of communications link that has limited bandwidth resources, where the bandwidth resources can be at least partially shared through multicasting.

Figure 2:
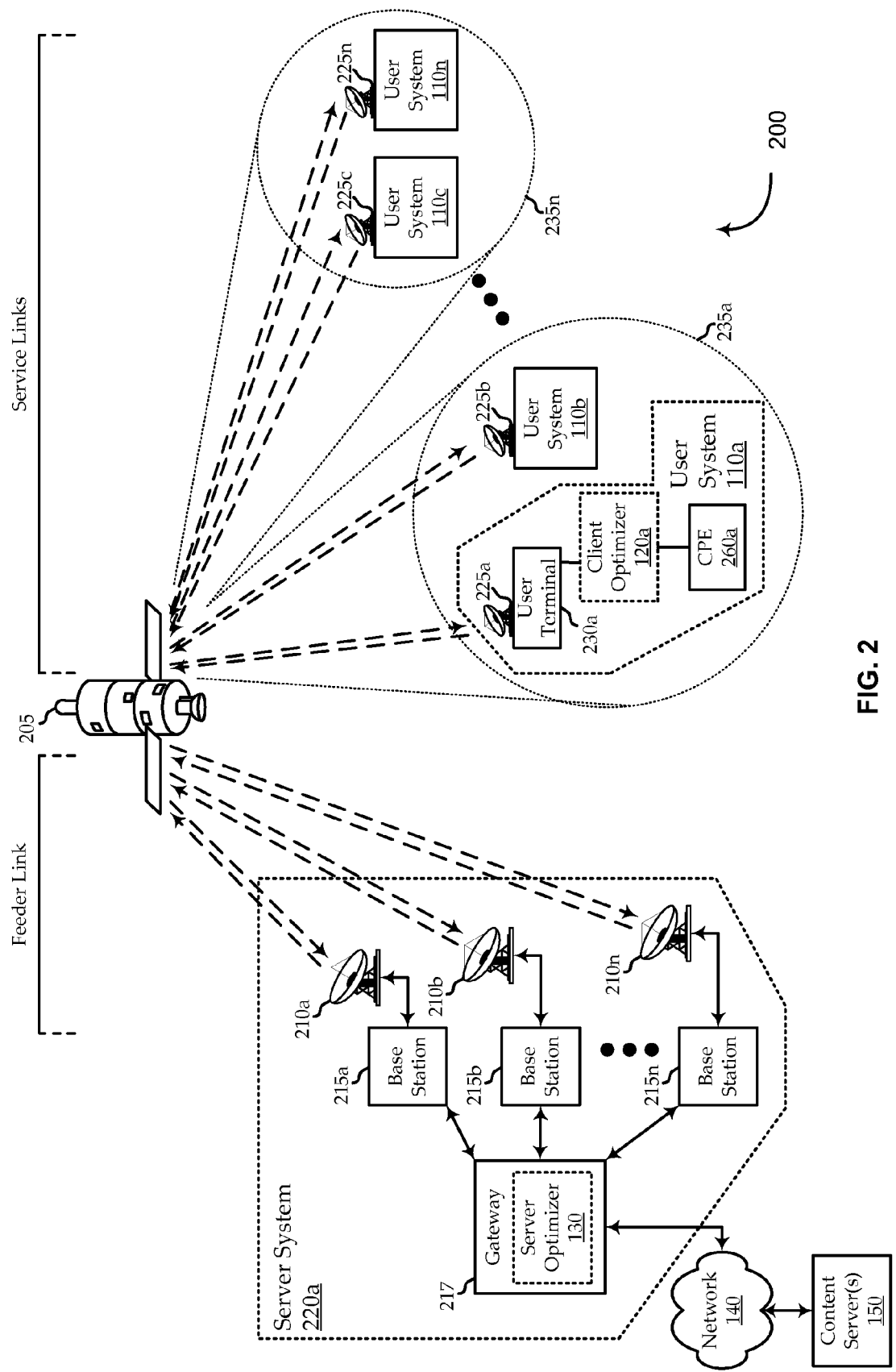
FIG. 2 shows a block diagram of an embodiment of a satellite communications system having a server system in communication with multiple user systems via a satellite over multiple spot beams, according to various embodiments.

It will now be appreciated that embodiments of the client-server communication link 125, and the resulting optimizer tunnels 105, effectively provide transparent acceleration functionality to the user systems 110. This functionality will be described in more detail with respect to illustrative systems in FIGS. 2-5. FIG. 2 shows a block diagram of an embodiment of a satellite communications system 200 having a server system 220 in communication with multiple user systems 110 via a satellite 205 over multiple spot beams 235, according to various embodiments. The server system 220 may include any server components, including base stations 215, gateways 217, etc. A base station 215 is sometimes referred to as a hub or ground station. In certain embodiments, as described below, the base station 215 has functionality that is the same or different from a gateway 217. For example, as illustrated, a gateway 217 provides an interface between the network 140 and the satellite 205 via a number of base stations 215. Various embodiments provide different types of interfaces between the gateways 217 and base stations 215. For example, the gateways 217 and base stations 215 may be in communication over leased high-bandwidth lines (e.g., raw Ethernet), a virtual private large-area network service (VPLS), an Internet protocol virtual private network (IP VPN), or any other public or private, wired or wireless network. Embodiments of the server system 220 are in communication with one or more content servers 150 via one or more networks 140.

In some embodiments, the gateway 217 is configured to implement relatively simple routing functions. For example, the gateway 217 may receive traffic from the network 140, determine which of the base stations 215 should receive the traffic, and route the traffic accordingly. In other embodiments, the gateway 217 performs relatively complex functions, including, for example, network security, accounting, content acceleration, trend analysis, signal processing and/or encoding, etc. In still other embodiments, the gateway 217 and the base stations 215 share some or all of the desired network functionality. For example, it may be desirable to perform certain functions in one location, perform other functions in a distributed manner, and perform still other functions in a redundant manner.

As traffic traverses the satellite communications system 200 in multiple directions, the gateway 217 may be configured to implement multi-directional communications functionality. For example, the gateway 217 may send data to and receive data from the base stations 215. Similarly, the gateway 217 may be configured to receive data and information directed to one or more user systems 110, and format the data and information for delivery to the respective destination device via the satellite 205; or receive signals from the satellite 205 (e.g., from one or more user systems 110) directed to a destination in the network 140, and process the received signals for transmission through the network 140.

In one embodiment, the satellite communications system 200 includes a number of gateways 217 distributed over a large geographic region. Each gateway 217 is in communication with the network 140 via a high-speed connection (e.g., a dedicated high-bandwidth fiber link). Each gateway 217 is also in communication with, and handles communications for, up to twenty base stations 215 (e.g., twenty feeder links). Each of the twenty base stations 215 is configured to service up to four user links by communicating content for those user links to the satellite 205 using an antenna 210.

In various embodiments, one or more of the satellite links are capable of communicating using one or more communication schemes. In various embodiments, the communication schemes may be the same or different for different links. The communication schemes may include different types of coding and modulation combinations. For example, various satellite links may communicate using physical layer transmission modulation and coding techniques using adaptive coding and modulation schemes, etc. The communication schemes may also use one or more different types of multiplexing schemes, including Multi-Frequency Time-Division Multiple Access ("MF-TDMA"), Time-Division Multiple Access ("TDMA"), Frequency Division Multiple Access ("FDMA"), Orthogonal Frequency Division Multiple Access ("OFDMA"), Code Division Multiple Access ("CDMA"), or any number of other schemes.

Embodiments of the satellite 205 may be implemented as a geostationary satellite 205, a low earth orbit ("LEO") satellite 205, or aerial payloads not in orbit and held aloft by planes, blimps, weather balloons, etc. Other embodiments could have a number of satellites 205 instead of just one. In one embodiment, the satellite 205 is configured as a "bent pipe" satellite, wherein the satellite 205 may frequency convert the received carrier signals before retransmitting these signals to their destination, but otherwise perform little or no other processing on the contents of the signals. There could be a single carrier signal for each service spot beam 235 or multiple carriers in different embodiments. Similarly, single or multiple carrier signals could be used for feeder spot beams. A variety of physical layer transmission modulation and coding techniques may be used by the satellite 205 in accordance with certain embodiments, including those defined with the DVB-S2 standard. For other embodiments, a number of configurations are possible (e.g., using LEO satellites, mesh networks, star networks, etc.).

The satellite 205 may operate in a multi-beam mode, transmitting a number of spot beams 235, each directed at a different region of the earth. Each spot beam 235 may be associated with one of the user links, and used to communicate between the satellite 205 and a large group (e.g., thousands) of user systems 110 (e.g., user terminals 230 within the user systems 110). The signals transmitted from the satellite 205 may be received by one or more user systems 110, via a respective user antenna 225. In some embodiments, some or all of the user systems 110 include one or more user terminals 230 and one or more CPE devices 260. User terminals 230 may include modems, satellite modems, routers, or any other useful components for handling the user-side communications. Reference to "users" should be construed generally to include any user (e.g., subscriber, consumer, customer, etc.) of services provided over the satellite communications system 200 (e.g., by or through the server system 220).

In a given spot beam 235, some or all of the users (e.g., user systems 110) serviced by the spot beam 235 may be capable of receiving all the content traversing the spot beam 235 by virtue of the fact that the satellite communications system 200 employs wireless communications via various antennae (e.g., 210 and 225). However, some of the content may not be intended for receipt by certain customers. As such, the satellite communications system 200 may use various techniques to "direct" content to a user or group of users. For example, the content may be tagged (e.g., using packet header information according to a transmission protocol) with a certain destination identifier (e.g., an IP address), use different modcode points that can be reliably received only by certain user terminals 230, send control information to user systems 110 to direct the user systems 110 to ignore or accept certain communications, etc. Each user system 110 may then be adapted to handle the received data accordingly. For example, content destined for a particular user system 110 may be passed on to its respective CPE 260, while content not destined for the user system 110 may be ignored. In some cases, the user system 110 stores information not destined for the associated CPE 260 for use if the information is later found to be useful in avoiding traffic over the satellite link, as described in more detail below.

In some embodiments, each user system 110 implements a client optimizer 120 that is in communication with a server optimizer 130 located in the server system 220 (e.g., in the gateway 217). The client optimizers 120 and server optimizer 130 may act to create a virtual tunnel between the user systems 110 and the content servers 150, as described with reference to FIG. 1A. In a topology, like the satellite communications system 200 shown in FIG. 2, vast amounts of traffic may traverse various portions of the satellite communications system 200 at any given time. As discussed above, at least some of the traffic traversing the network may be intercepted by the server optimizer 130 for further processing and for additional functionality. The functionality of the server optimizer 130 may also be assisted and/or exploited by other components of the server system 220 and the user systems 110. Some of this and other functionality of components of an illustrative server system 220 and an illustrative user system 110 are described with reference to various types of functional blocks in FIGS. 3 and 4, respectively.

Figure 3:
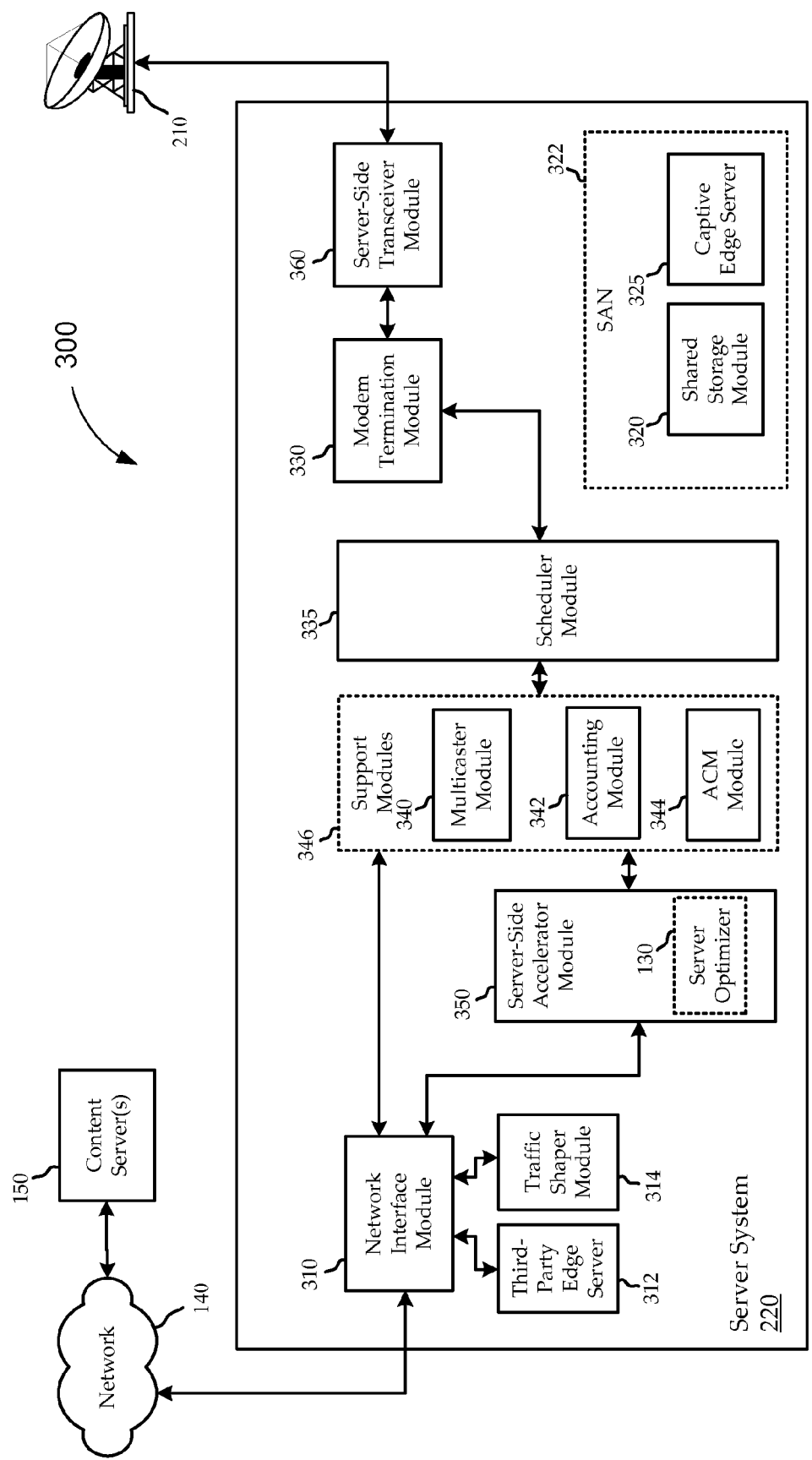
FIG. 3 shows a simplified block diagram illustrating an embodiment of a server system coupled between a network and an antenna, according to various embodiments.

FIG. 3 shows a simplified block diagram 300 illustrating an embodiment of a server system 220 coupled between a network 140 and an antenna 210, according to various embodiments. The server system 220 has a number of components, including a network interface module 310, a modem termination module 330, and a server-side transceiver module 360. Components of the server system 220 may be implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

Embodiments of the server system 220 receive data from the network 140 (e.g., the network 140 of FIG. 1A), including data originating from one or more content servers 150 (e.g., or other types of servers, as discussed above) and destined for one or more users in a spot beam (e.g., at a user system 110 in a spot beam 235, as shown in FIG. 2). The data is received at the network interface module 310, which includes one or more components for interfacing with the network 140. For example, the network interface module 310 includes a network switch and a router.

In some embodiments, the network interface module 310 interfaces with other modules, including a third-party edge server 312 and/or a traffic shaper module 314. The third-party edge server 312 may be adapted to mirror content (e.g., implementing transparent mirroring, like would be performed in a point of presence ("POP") of a content delivery network ("CDN")) to the server system 220. For example, the third-party edge server 312 may facilitate contractual relationships between content providers and service providers to move content closer to users in a communications network (e.g., the satellite communications network 200 of FIG. 2). The traffic shaper module 314 controls traffic from the network 140 through the server system 220, for example, to help optimize performance of the communications system (e.g., by reducing latency, increasing effective bandwidth, etc.). In one embodiment, the traffic shaper module 314 delays packets in a traffic stream to conform to a predetermined traffic profile.

Traffic is passed from the network interface module 310 to one or more processing modules. In some embodiments, the processing modules include a server-side accelerator module 350, a scheduler module 335, and support modules 346. In some embodiments, all traffic from the network interface module 310 is passed to the server-side accelerator module 350 for handling, as described more fully below. In other embodiments, some or all of the traffic from the server-side accelerator module 350 is passed to the support modules 346. For example, in one embodiment, real-time types of data (e.g., User Datagram Protocol ("UDP") data traffic, like Internet-protocol television ("IPTV") programming) bypass the server-side accelerator module 350, while non-real-time types of data (e.g., Transmission Control Protocol ("TCP") data traffic, like web video) are routed through the server-side accelerator module 350 for processing. Embodiments of the server-side accelerator module 350 provide various types of applications, WAN/LAN, and/or other acceleration functionality. In one embodiment, the server-side accelerator module 350 implements functionality of AcceleNet applications from Intelligent Compression Technologies, Inc. ("ICT"), a division of ViaSat, Inc. This functionality may be used to exploit information from application layers of the protocol stack (e.g., layers 4-7 of the IP stack) through use of software or firmware operating in the user system 110 (e.g., in the user terminal 230 and/or the CPE 260).

In some embodiments, the server-side accelerator module 350 is adapted to provide high payload compression. This allows faster transfer of the data and enhances the effective capacity of the network. The server-side accelerator module 350 can also implement protocol-specific methods to reduce the number of round trips needed to complete a transaction, such as by prefetching objects embedded in HTTP pages. In other embodiments, functionality of the server-side accelerator module 350 is closely integrated with the satellite link through other modules, including the support modules 346, the scheduler module 335, the modem termination module 330, etc., to reduce upload bandwidth requirements and/or to more efficiently schedule to the satellite link. For example, the link layer may be used to determine whether packets are successfully delivered, and those packets can be tied more closely with the content they supported through application layer information. In certain embodiments, these and/or other functions of the server-side accelerator module 350 are provided by a server optimizer 130 resident on (e.g., or in communication with) the server-side accelerator module 350.

In some embodiments, the server optimizer 130 is implemented with multiple servers. Each of the multiple servers may be configured to handle a portion of the traffic passing through the server-side accelerator module 350. It is worth noting that functionality of various embodiments described herein use data which, at times, may be processed across multiple servers. As such, one or more server management modules may be provided for processing (e.g., tracking, routing, partitioning, etc.) data across the multiple servers. For example, when one server within the server optimizer 130 receives a request from a user (e.g., from a user system 110 on a spot beam 235, as shown in FIG. 2), the server management module may process that request in the context of other requests received at other servers in the server optimizer 130. In one embodiment, coordination between servers is implemented in support of singular storage of data. For example, it may be desirable to avoid caching the same byte sequence twice in two servers that are in communication with each other (e.g., where both servers are part of a storage area network 322 ("SAN") in the server system 220). In another embodiment, servers are configured to communicate to facilitate the identification of deltacasting opportunities (e.g., use of deltacasting to handle live content requests and/or overlapping content requests), as described more fully below.

It will be appreciated that, while the server optimizer 130 is illustrated as part of the server system 220, this should not be construed as limiting the location or implementation of the server optimizer 130. In one embodiment, the server optimizer 130 is implemented by a server in communication with the server system 220 over the network 140. For example, a third party may lease server space that is accessible over the Internet or a private connection (e.g., a high-speed fiber connection). The leased server space may be used for serving the server optimizer 130.

Data processed by the server-side accelerator module 350 may pass through the support modules 346 to the scheduler module 335. Embodiments of the support modules 346 include one or more types of modules for supporting the functionality of the modem termination module 330, for example, including a multicaster module 340, an accounting module 342, and an adaptive coding and modulation ("ACM") module 344. In certain embodiments, some or all of the support modules 346 include off-the-shelf types of components.

Embodiments of the multicaster module 340 provide various functions relating to multicasting of data over the links of the communications system. Certain embodiments of the multicaster module 340 use data generated by other processing modules (e.g., the server-side accelerator module 350) to prepare traffic for multicasting. For example, the multicaster module 340 may prepare datagrams as a multicast stream. Other embodiments of the multicaster module 340 perform more complex multicasting-related functionality. For example, the multicaster module 340 may contribute to determinations of whether data is unicast or multicast to one or more users (e.g., using information generated by the server-side accelerator module 350), what modcodes to use, whether data should or should not be sent as a function of data stored at destination user terminals 230, how to handle certain types of encryption, etc.

Embodiments of the accounting module 342 implement various accounting-related functions. In one embodiment, the accounting module 342 collects data from multiple components to determine how much network usage to attribute to a particular user. For example, the accounting module 342 may determine how to count upload or download traffic against a user's fair access policy (FAP). In another embodiment, the accounting module 342 dynamically adjusts FAPs according to various network link and/or usage conditions. For example, the accounting module 342 may adjust FAPs to encourage network usage during lower traffic times. In yet another embodiment, the accounting module 342 affects the operation of other components of the modem termination module 330 as a function of certain FAP and/or other accounting conditions. For example, the accounting module 342 may direct the multicaster module 340 to multicast certain types of data or to prevent certain users from joining certain multicast streams as a function of FAP or other considerations.

Embodiments of the ACM module 344 implement various ACM functions. For example, the ACM module 344 may track link conditions for certain spot beams, users, etc., for use in dynamically adjusting modulation and/or coding schemes. In some embodiments, the ACM module 344 may help determine which users should be included in which customer groupings or multicast streams as a function of optimizing resources through modcode settings. In certain embodiments, the ACM module 344 implements ACM-aware encoding of data adapted for progressive encoding. For example, MPEG-4 video data may be adapted for progressive encoding in layers (e.g., a base layer and enhancement layers). The ACM module 344 may be configured to set an appropriate modcode separately for each layer to optimize video delivery.

When traffic has been processed by the server-side accelerator module 350 and/or the support modules 346, the traffic is passed to the scheduler module 335. Embodiments of the scheduler module 335 are configured to provide various functions relating to scheduling the links of the communications system handled by the server system 220. For example, the scheduler module 335 may manage link bandwidth by scheduling license grants within a spot beam.

In some embodiments, functionality of the server system 220 involves communication and interaction with the SAN 322. Embodiments of the SAN 322 include a shared storage module 320, which may include any useful type of memory store for various types of functionality of the server system

220. For example, the shared storage module 320 may include volatile or non-volatile storage, servers, files, queues, etc. In certain embodiments, the SAN 322 further includes a captive edge server 325, which may be in communication with the shared storage module 320. In some embodiments, the captive edge server 325 provides functionality similar to that of the third-party edge server 312, including content mirroring. For example, the captive edge server 325 may facilitate different contractual relationships from those of the third-party edge server 312 (e.g., between the server system 220 provider and various content providers). In certain embodiments, the captive edge server 325 and/or the third-party edge server 312 are in communication with server-side storage (e.g., within the SAN 322).

It will be appreciated that components of the server system 220 may provide many different types of functionality. For example, some embodiments oversee a variety of decoding, interleaving, decryption, and unscrambling techniques. Other embodiments manage functions applicable to the communication of content downstream through a satellite (e.g., the satellite 205 of FIG. 2) to one or more users (e.g., user systems 110 of FIG. 2). As described more fully below with reference to various embodiments, the server system 220 may handle different types of traffic in different ways. For example, some uses of the communications system involve contractual relationships and/or obligations with third-party content providers to interface with their edge servers (e.g., through the third-party edge server 312), while other uses involve locally "re-hosting" certain content (e.g., through the captive edge server 325). Further, some use cases handle real-time types of data (e.g., UDP data) differently from non-real-time types of data (e.g., TCP data). Many other uses are possible.

In certain embodiments, some or all of these downstream communications functions are handled by the server-side transceiver module 360. Embodiments of the server-side transceiver module 360 encode and/or modulate data, using one or more error correction techniques, adaptive encoding techniques, baseband encapsulation, frame creation, etc. (e.g., using various modcodes, lookup tables, etc.). Other functions may also be performed by the server-side transceiver module 360 or other components of the server system 220, including upconverting, amplifying, filtering, tuning, tracking, etc. For example, in the context of the satellite communications system 200 of FIG. 2, the server-side transceiver module 360 may communicate data to one or more antennae 210 for transmission via the satellite 205 to the user systems 110. Embodiments of the server system 220 also include the modem termination module 330 for receiving modem traffic over the satellite link from users. In some embodiments, the modem termination module 330 is configured substantially as a satellite modem termination system ("SMTS").

In other embodiments, downstream functions and or other functions of the server system 220 are centralized and/or distributed according to various embodiments of the invention. For example, as shown in FIG. 2, a server system 220 may include a number of base stations 215, gateways 217, and/or other components (e.g., hubs, cross-connects, cores, etc.). Similarly, in other types of communications systems, multiple server system 220 components may perform various functions on the server-side of the communications system. In some embodiments, substantially each server system 220 node (e.g., each base station 215, gateway 217, etc.) is capable of performing substantially all the server system 220 functionality. In other embodiments, much of the advanced processing server system 220 functionality is implemented in edge nodes (e.g., base stations 215) of the server system 220, while other nodes (e.g., gateways 217, cores, cross-connects, etc.) provide more basic routing and/or switching functions. In still other embodiments, edge node functionality is fairly limited, while advanced processing functions are more centralized (e.g., in gateways 217, core nodes, etc.).

Figure 4:
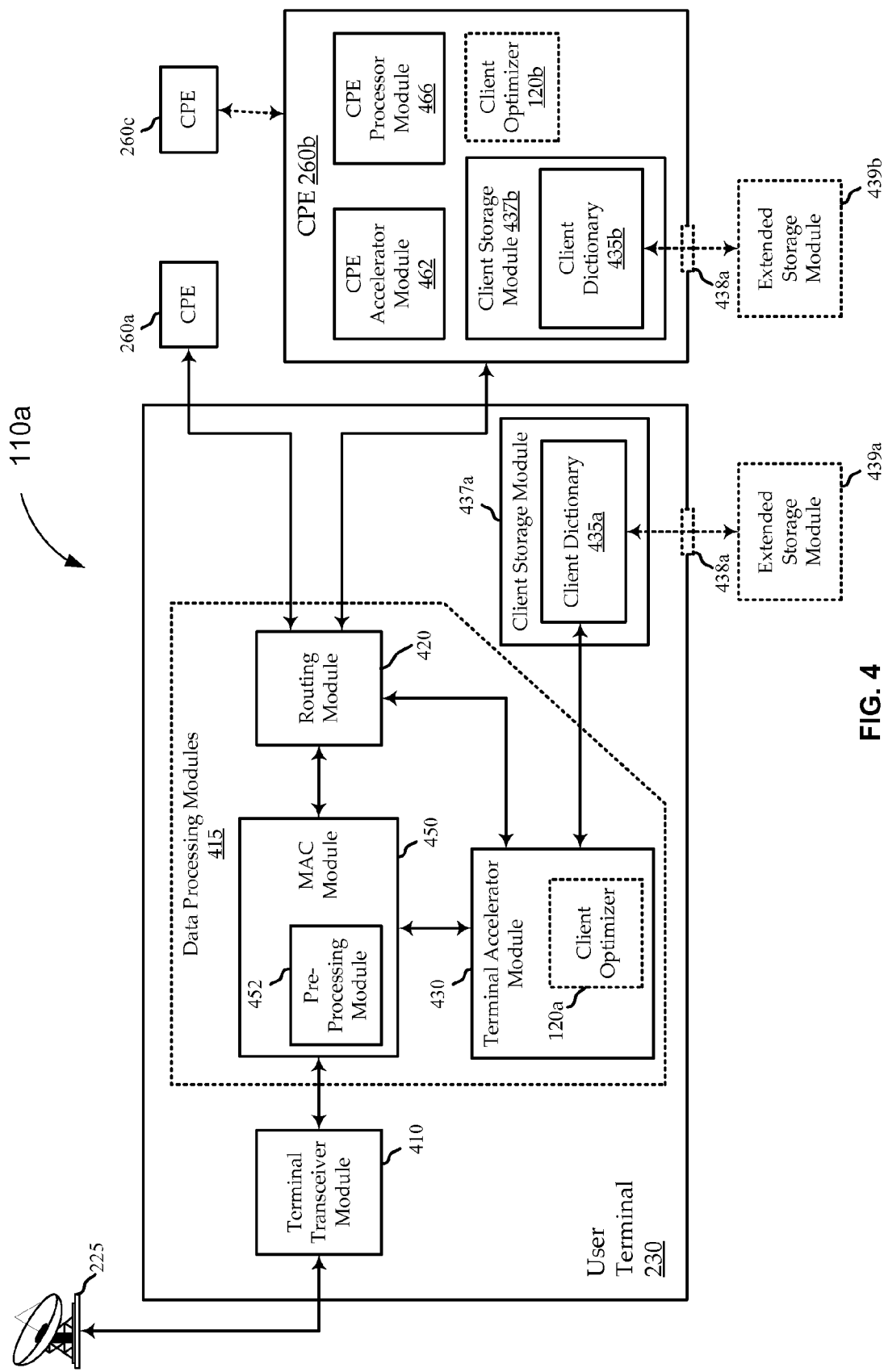
FIG. 4 shows a simplified block diagram of an embodiment of a user system, including an embodiment of a user terminal coupled between a user antenna and a CPE, according to various embodiments.

As described above (e.g., with reference to FIGS. 1 and 2), the server system 220 communicates with one or more user systems 110 configured to perform various user-side (e.g., client-side) communications functions. FIG. 4 shows a simplified block diagram of an embodiment of a user system 110a, including an embodiment of a user terminal 230 coupled between a user antenna 225 and a CPE 260, according to various embodiments. Some embodiments of the user system 110 are configured, as shown in FIG. 2, to communicate over a satellite communications system 200 by interfacing with a server system 220 over a satellite link (e.g., the server system 220 of FIG. 3). Interfacing and other functionality of the user system 110 may be provided by components of the user terminal 230, including a terminal transceiver module 410, data processing modules 415, and a client storage module 437. Embodiments of the data processing modules 415 include a MAC module 450, a terminal accelerator module 430, and a routing module 420.

The components may be implemented, in whole or in part, in hardware. Thus, they may include one or more ASICs adapted to perform a subset of the applicable functions in hardware. Alternatively, the functions may be performed by one or more other processing modules (or cores), on one or more integrated circuits. In other embodiments, other types of integrated circuits may be used (e.g., Structured/Platform ASICs, FPGAs, and other Semi-Custom ICs), which may be programmed. Each may also be implemented, in whole or in part, with instructions embodied in a computer-readable medium, formatted to be executed by one or more general or application specific processors.

A signal from the user antenna 225 is received by the user terminal 230 at the terminal transceiver module 410. Embodiments of the terminal transceiver module 410 may amplify the signal, acquire the carrier, and/or downconvert the signal. In some embodiments, this functionality is performed by other components (either inside or outside the user terminal 230).

In some embodiments, data from the terminal transceiver module 410 (e.g., the downconverted signal) is communicated to the data processing modules 415 for processing. For example, data is communicated to the MAC module 450. Embodiments of the MAC module 450 prepare data for communication to other components of, or in communication with, the user terminal 230, including the terminal accelerator module 430, the routing module 420, and/or the CPE 260. For example, the MAC module 450 may modulate, encode, filter, decrypt, and/or otherwise process the data to be compatible with the CPE 260.

In some embodiments, the MAC module 450 includes a pre-processing module 452. The pre-processing module 452 implements certain functionality for optimizing the other components of the data processing modules 415. In some embodiments, the pre-processing module 452 processes the signal received from the terminal transceiver module 410 by interpreting (e.g., and decoding) modulation and/or coding schemes, interpreting multiplexed data streams, filtering the digitized signal, parsing the digitized signal into various types of information (e.g., by extracting the physical layer header), etc. In other embodiments, the pre-processing module 452 pre-filters traffic to determine which data to route directly to the routing module 420, and which data to route through the terminal accelerator module 430 for further processing.

Embodiments of the terminal accelerator module 430 provide substantially the same functionality as the server-side accelerator module 350, including various types of applications, WAN/LAN, and/or other acceleration functionality. In one embodiment, the terminal accelerator module 430 implements functionality of AcceleNet™ applications, like interpreting data communicated by the server system 220 using high payload compression, handling various prefetching functions, parsing scripts to interpret requests, etc. In certain embodiments, these and/or other functions of the terminal accelerator module 430 are provided by a client optimizer 120 resident on (e.g., or in communication with) the terminal accelerator module 430. Notably, in some embodiments, the client optimizer 120 is implemented as client optimizer 120*a* on the user terminal 230 and/or client optimizer 120*b* on the CPE 260*b*. Data from the MAC module 450 and/or the terminal accelerator module 430 may then be routed to one or more CPEs 260 by the routing module 420.

In some embodiments, output from the data processing modules 415 and/or the terminal accelerator module 430 is stored in the client storage module 437*a*. Further, the data processing modules 415 and/or the terminal accelerator module 430 may be configured to determine what data should be stored in the client storage module 437*a* and which data should not (e.g., which data should be passed to the CPE 260). It will be appreciated that the client storage module 437*a* may include any useful type of memory store for various types of functionality of the user system 110. For example, the client storage module 437*a* may include volatile or non-volatile storage, servers, files, queues, etc. Embodiments of the client storage module 437*a* are configured to store some or all of a client dictionary 435, as described more fully below.

In certain embodiments, storage functionality and/or capacity is shared between an integrated (e.g., on-board) client storage module 437*a* and an extended (e.g., off-board) storage module 439*a*. For example, the extended storage module 439*a* may be implemented in various ways, including as an attached peripheral device (e.g., a thumb drive, USB hard drive, etc.), a wireless peripheral device (e.g., a wireless hard drive), a networked peripheral device (e.g., a networked server), etc. In some embodiments, the user terminal 230 interfaces with the extended storage module 439*a* through one or more ports 438*a*. In one embodiment, functionality of the client storage module 437 is implemented as storage integrated into or in communication with CPE 260 (e.g., as client storage module 437*b* in CPE 260*b*).

Some embodiments of the CPE 260 are standard CPE 260 devices or systems with no specifically tailored hardware or software (e.g., shown as CPE 260*a*). Other embodiments of the CPE 260, however, include hardware and/or software modules adapted to optimize or enhance integration of the CPE 260 with the user terminal 230 (e.g., shown as alternate CPE 260*b*). For example, the alternate CPE 260*b* is shown to include a CPE accelerator module 462, a CPE processor module 466, and a client storage module 437*b*. Embodiments of the client storage module 437*b* are configured to store some or all of the client dictionary 435*b*. Embodiments of the CPE accelerator module 462 are configured to implement the same, similar, or complementary functionality as the terminal accelerator module 430. For example, the CPE accelerator module 462 may be a software client version of the terminal accelerator module 430. In some embodiments, some or all of the functionality of the data processing modules 415 is implemented by the CPE accelerator module 462 and/or the CPE processor module 466. In these embodiments, it may be possible to reduce the complexity of the user terminal 230 by shifting functionality to the alternate CPE 260*b*.

Embodiments of the client storage module 437*b* may include any type of dictionary, object or byte caching, data serving, and/or other storage-related components in or in communication with the alternate CPE 260*b* (e.g., a computer hard drive, a digital video recorder ("DVR"), etc.). In some embodiments, the client storage module 437*b* is in communication with an extended storage module 439*b*, for example, via one or more ports 438*b*. Of course, many types of CPE 260 are possible, and the functionality of the CPE 260 may be implemented in a number of different types of devices or systems. In some embodiments, the CPE 260 is a fixed or mobile end device for displaying content to the user, like a television, personal computer, home theater system, cellular telephone, portable music or video player, personal digital assistant, etc. In other embodiments, the CPE 260 is an intermediate device, configured to communicate to another CPE 260 end device (or even to another CPE 260 intermediate device). For example, the CPE 260 may include a set-top box, a home networking component (e.g., a router, a hub, a femtocell, etc.), or any other type of intermediate device. As shown, CPE 260*c* is in communication with the user terminal 230 indirectly through CPE 260*b*, where CPE 260*b* is acting as an intermediate device.

Further, in some embodiments, the CPE 260 is integrated, partially or completely, with the user terminal 230. For example, a home theater system may be built around a main interface component that includes a network interface having user terminal 230 functionality, certain CPE 260 functionality, and ports for wired or wireless communication with additional CPE 260 devices. Embodiments of user terminals 230 and/or CPEs 260 may also be configured for compatibility with certain communication standards. For example, CPEs 260 may be configured to support plug-and-play functionality (e.g., through the Digital Living Network Alliance (DLNA) standard), wireless networking (e.g., through the 802.11 standard), etc.

In certain embodiments, the user terminal 230 is configured to transmit data back to the server system 220. Embodiments of the data processing modules 415 and the terminal transceiver module 410 are configured to provide functionality for communicating information back through the communications system (e.g., through the satellite communications system 200 of FIG. 2 for directing provision of services). For example, information about what is stored in the client dictionary 435 may be sent back to the server system 220 for limiting repetitious file transfers, as described more fully below.

It will be appreciated that the communications system may be used to provide different types of communication services to users. For example, the satellite communications system 200 of FIG. 2 may provide content from content servers 150, through the network 140, to a user's CPE 260, including Internet content, broadcast television and radio content, on-demand content, voice-over-Internet-protocol (VoIP) content, and/or any other type of desired content. It will be further appreciated that this content may be communicated to users in different ways, including through unicast, multicast, broadcast, and/or other communications.

As described more fully below, a number of additional and/or improved communications functions may be facilitated by exploiting content sharing and/or other types of opportunities through deltacasting. For example, in a typical communications system, like the satellite communications system 200 of FIG. 2, multiple customers may request substantially the same content at substantially the same time. By exploiting this feature of the communication system, it may be possible to optimize (at least partially) the provision of various communication services. For example, link conditions (e.g., bandwidth utilization) may be improved, enhanced services may be offered to customers, costs relating to service provision may be reduced, etc.

Content sharing may be implemented in many different ways, according to embodiments. For example, certain content may be multicast to a number of users in a spot beam, thereby allowing multiple user systems 110 to share channels (i.e., potentially increasing effective throughput). Rather than transmitting a copy of the content to each requesting user through a private unicast channel, fewer copies of the content may be shared by multiple users. In certain embodiments, custom or off-the-shelf components are used to provide this functionality by evaluating multiple communication streams and collapsing them into a single stream within some tolerance (e.g., a small "jitter window," accounting for inter-packet delay variances). In other embodiments, dedicated components in the server system 220 implement this functionality.

According to various embodiments, deltacasting and related functionality may be implemented at least partially through client-server interactions. As discussed above, a server optimizer 130 may determine what content is traversing the various links in the communications system using fingerprints. For example, the fingerprints may be used to identify fingerprint trends (e.g., patterns of byte-sequence communications) and/or to identify actual content features (e.g., information from layers 4-7 of the OSI IP protocol stack). These determinations may then be used to identify and exploit opportunities for improving the communication services over the communications system.

Figure 5:
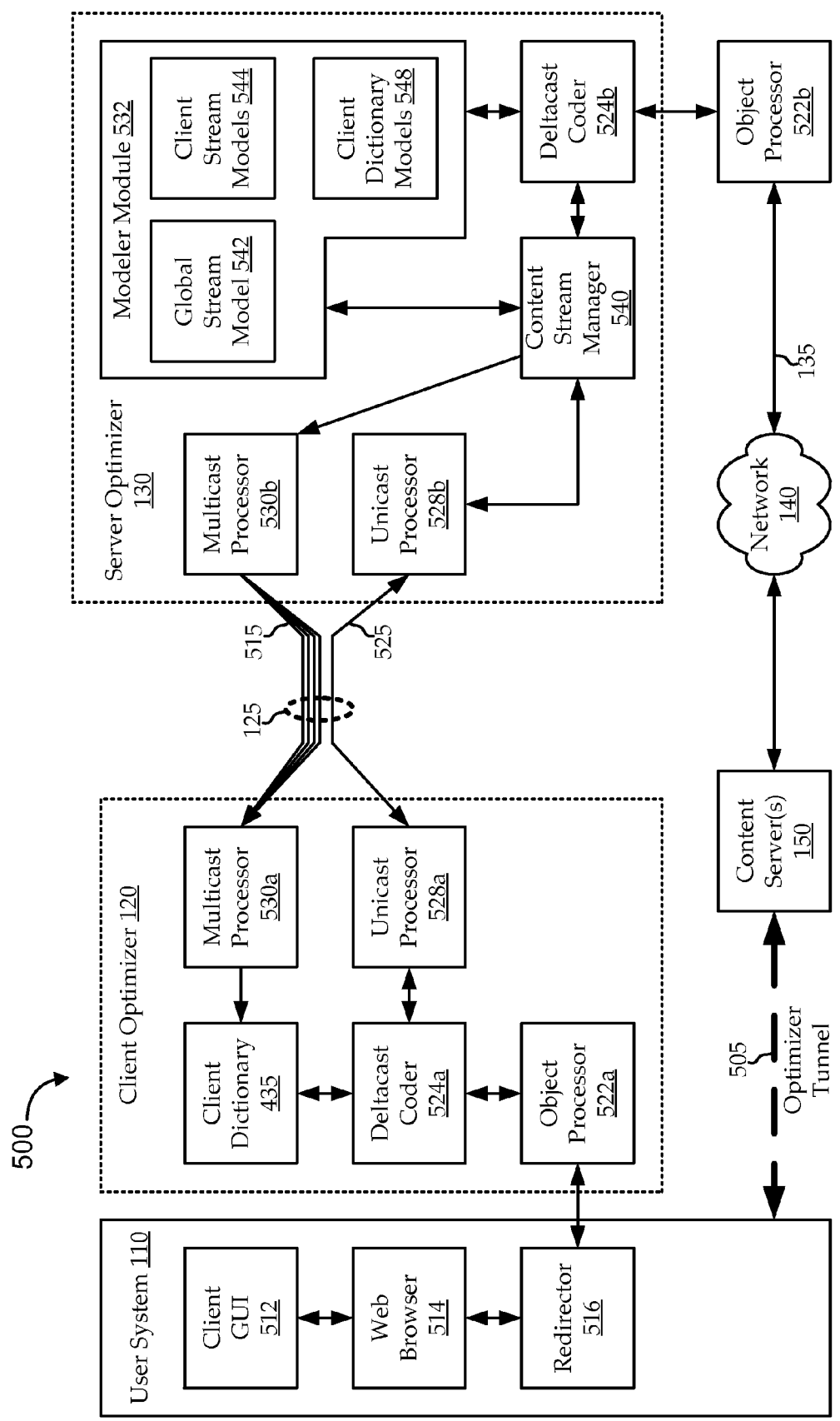
FIG. 5 shows a block diagram of an embodiment of a communications system, illustrating client-server interactivity through a client optimizer and a server optimizer, according to various embodiments.

FIG. 5 shows a block diagram of an embodiment of a communications system 500, illustrating client-server interactivity through a client optimizer 120 and a server optimizer 130, according to various embodiments. In some embodiments, the communications system 500 is an embodiment of the communications system 100*a* of FIG. 1A or the satellite communications system 200 of FIG. 2. As shown, the communications system 500 facilitates communications between a user system 110 and one or more content servers 150 via at least one client-server communication link 125 and at least one content network link 135. For example, interactions between the client optimizer 120 and the server optimizer 130 effectively create a tunnel 505 between the user system 110 and the content servers 150. In some embodiments, the content network link 135 includes links through a network 140, like the Internet. Also, as illustrated, embodiments of the client-server communication link 125 support one or more unicast service flows 525 and one or more multicast service flows 515.

In some embodiments, the user system 110 includes a client graphical user interface (GUI) 512, a web browser 514, and a redirector 516. The client GUI 512 may allow a user to configure performance aspects of the user system 110 (e.g., or even aspects of the greater communications system 500 in some cases). For example, the user may adjust compression parameters and/or algorithms, alter content filters (e.g., for blocking illicit websites), or enable or disable various features used by the communications system 500. In one embodiment, some of the features may include network diagnostics, error reporting, as well as controlling, for example, components of the client optimizer 120 and/or the server optimizer 130.

In one embodiment, the user selects a universal recourse locator (URL) address through the client GUI 512 which directs the web browser 514 (e.g., Internet Explorer®, Firefox®, Netscape Navigator®, etc.) to a website (e.g., cnn.com, google.com, yahoo.com, etc.). The web browser 514 may then issue a request for the website and associated objects to the Internet. It is worth noting that the web browser 514 is shown for illustrative purposes only. While embodiments of the user system 110 may typically include at least one web browser 514, user systems 110 may interact with content servers 150 in a number of different ways without departing from the scope of the invention.

The content request from the user system 110 (e.g., from the web browser 514) may be intercepted by the redirector 516. It is worth noting that embodiments of the redirector 516 are implemented in various ways. For example, embodiments of the redirector 516 are implemented within a user modem as part of the modem's internal routing functionality. The redirector 516 may send the request to the client optimizer 120. It is worth noting that the client optimizer 120 is shown as separate from the user system 110 (e.g., in communication over a local bus, on a separate computer system connected to the user system 110 via a high speed/low latency link, like a branch office LAN subnet, etc.). However, embodiments of the client optimizer 120 are implemented as part of the user system 110 in any useful client-side location, including as part of a user terminal, as part of a user modem, as part of a hub, as a separate hardware component, as a software application on the client machine, etc.

In one embodiment, the client optimizer 120 includes an object processor 522*a*. The object processor 522*a* may be configured to perform a number of different processing functions, including Java parsing and protocol processing. Embodiments of the object processor 522*a* may process hypertext transfer protocol (HTTP), file transfer protocol (FTP), various media protocols, metadata, header information, and/or other relevant information from the request data (e.g., packets) to allow the client optimizer 120 to perform its optimizer functions. For example, the request may be processed by the object processor 522*a* to determine which objects are being requested and whether data needed to generate the requested object is already stored in the client storage (not shown) (e.g., in the client dictionary 435 from a prefetch operation, a pre-positioning operation, a multicast caching operation, a previous deltacasting operation, etc.).

In some embodiments, the object processor 522*a* sends the processed request data to a deltacast coder 524*a*. Embodiments of the deltacast coder 524*a* are configured to implement various types of deltacasting functions, as described in U.S. patent application Ser. No. 12/651,909, titled "DELTACASTING," filed on Jan. 4, 2010, which is incorporated above. In other embodiments, the deltacast coder 524*a* implements one or more dictionary coding or similar techniques (e.g., delta coding). For example, the deltacast coder 524*a* may encode the request into a compressed version of the request using one or more data compression algorithms. These algorithms may employ dictionary coding with the client dictionary 435 configured to store strings so that data from previous web objects can be used to compress data from new pages. Of course, other types of coding are possible according to other embodiments of the deltacast coder 524*a*.

The processed and/or coded request data may then be further processed by a unicast processor 528*a* in some embodiments in preparation for communicating the data over the client-server communication link 125 (e.g., as private IP traffic). In various embodiments, the unicast processor 528*a* processes the data according to one or more protocols, for example a unicast protocol, depending at least on the type of communication links implemented as part of the client-server communication link 125. For example, the client-server communication link 125 may include a wireless link, a cellular link, a satellite link, a dial-up link, etc. In certain embodiments, the unicast processor 528*a* is configured to implement the Intelligent Compression Technology (ICT) transport protocol (ITP). In one embodiment, ITP maintains a persistent connection between the client optimizer 120 and the server optimizer 130. The persistent connection may enable the communications system 500 to reduce or eliminate inefficiencies and overhead costs associated with creating a new connection for each request.

In some embodiments, the communication is received at the other end of the client-server communication link 125 by a unicast processor 528*b* in the server optimizer 130. In some embodiments, the unicast processor 528*b* in the server optimizer 130 is implemented as substantially an identical component to the unicast processor 528*a* in the client optimizer 120. In other embodiments, implementations of the unicast processors 528 may be tailored to their location (e.g., in the client optimizer 120 or the server optimizer 130). When the request data is received by the unicast processor 528*b*, the unicast processor 528*b* may process the request according to the applied one or more protocols. For example, the unicast processor 528*b* may be configured to implement ITP, such that data sent from the unicast processor 528*a* according to the ITP protocol can be processed accordingly.

As discussed above, the data received at the server optimizer 130 from the client optimizer 120 may be coded (e.g., dictionary coded) and/or otherwise processed (e.g., according to one or more protocols, like HTTP). Embodiments of the server optimizer 130 include an object processor 522*b*, a deltacast coder 524*b*, a content stream manager 540, and a modeler module 532. In some embodiments, the object processor 522*b* and the deltacast coder 524*b* are configured to handle processing and/or coding of the request data implemented by the object processor 522*a* and the deltacast coder 524*a* of the client optimizer 120, respectively. For example, embodiments of the object processor 522*b* use features of the deltacast coder 524*b* and/or dictionary types of information, which may be stored, or modeled, in a modeler module 532 to decode the request data. The request may thus be processed (e.g., translated, decoded, etc.) into a format that is accessible to a source of the requested content (e.g., a website). In some embodiments, the content stream manager 540 handles some or all the functionality of the deltacast coder 524*b*. Of course, in certain embodiments, additional features of the request may be processed by these or other components. For example, if the request includes a cookie (or other special instructions), such as a "referred by" or type of encoding accepted, information about the cookie or instructions may be stored as part of a cookie model in the modeler module 532 or another location.

Embodiments of the object processor 522*b* may then forward the decoded request to an appropriate destination (e.g., a content server 150) over the content network link 135 (e.g., via a network 140). The content network link 135 may include, for example, a cable modem connection, a digital subscriber line (DSL) connection, a T1 connection, a fiber optic connection, etc. As discussed above, in some embodiments of the communications system 500, the content network link 135 manifests substantially lower latency than that of the client-server communication link 125.

Response data may be received by the object processor 522*b*, in response to the request, from the appropriate destination (e.g., the content server 150) over the content network link 135. It will be appreciated that the response data may include various types of information, such as one or more attachments (e.g., media files, text files, etc.), references to "in-line" objects needed to render a web page, etc. Embodiments of the object processor 522*b* may be configured to interpret the response data, which may, for example, be received as HTML, XML, CSS, Java Scripts, or other types of data. A fingerprint of the response data may be generated by the deltacast coder 524*b* (e.g., using dictionary coding techniques, as described above) and used for various types of optimization functions. For example, the fingerprint may be calculated using byte-level information from the response data. The fingerprints and/or byte-level information may also be stored in a server dictionary, cache, etc. by the modeler module 532.

In some embodiments, the content stream manager 540 looks at the fingerprints to identify and/or exploit deltacasting opportunities for collapsing multiple content streams. For example, as described below, the response data may be identified as part of a shared content stream in the context of live content requests and/or overlapping content requests. The fingerprints and/or corresponding data blocks may then be stored by the modeler module 532 (e.g., in a global stream model 542 and/or client stream models 544 for clients participating in the multicast). In certain embodiments, the fingerprint is used to determine how to further handle the response data, before, after, according to, and/or independent of other deltacasting determinations. For example, the deltacast coder 524*b* may make other types of deltacasting determinations, such as those described in U.S. patent application Ser. No. 12/651,909, titled "DELTACASTING," filed on Jun. 4, 2010, which is incorporated above.

In some embodiments, processed and/or coded (e.g., compressed) response data is sent over the client-server communication link 125 to the client optimizer 120. The data may be sent as a unicast service flow 525 from the unicast processor 528*b* in the server optimizer 130 to the unicast processor 528*a* in the client optimizer 120; and/or the data may be sent as one or more multicast service flows 515 from the multicast processor 530*b* in the server optimizer 130 to the multicast processor 530*a* in the client optimizer 120. In certain embodiments, standard protocols are adapted for use with the unicast service flows 525 and/or the multicast service flows 515. For example, the Pragmatic General Multicast ("PGM") protocol, the Negative-Acknowledgment ("NACK") Oriented Reliable Multicast ("NORM"), or "RFC 3940," protocol from the Internet Engineering Task Force ("IETF"), or other protocols may be used to implement multicasting.

Further, when the client-server communication link 125 includes multiple multicast service flows 515, the multicast service flows 515 may be configured in various ways. In various embodiments, for example, the multicast service flows 515 are configured to each communicate at a different modcode point, on a different spot beam, and/or on a different carrier. This may allow for more efficient communication of traffic to groups of user systems 110 having particular characteristics. For example, if certain traffic is determined to be destined for a user system 110 capable of communicating at a particular modcode point, the traffic may be multicast on a multicast service flow 515 that operates at or near this modcode point for maximum efficiency (e.g., rather than at the lowest modcode point needed to transmit to all user systems 110 in the multicast group). While this may, in certain cases, cause some of the user systems 110 in the multicast group to be unable to reliably receive all the multicast data, there may still be an overall improvement in the operation of the communications system 500.

In other embodiments, modcodes may be handled (e.g., selected, adapted, optimized, etc.) for various effects. In one embodiment, as described above, the modcode is selected according to link conditions between the server optimizer 130 and the client optimizer 120 associated with all clients participating in the shared content stream (i.e., so that at least those clients can reliably receive the communication). In another embodiment, the modcode is adapted to changes in link conditions between the server optimizer 130 and one or more client optimizers 120. For example, adaptive coding and modulation techniques may be used. The modcode may be adapted by estimating or monitoring link conditions from the server-side (e.g., estimating signal-to-noise ratios, bandwidth, etc.) or via feedback from the client-side.

The data received at the client optimizer 120 from the server optimizer 130 may be coded (e.g., dictionary coded) and/or otherwise processed (e.g., according to one or more protocols, like HTTP). Embodiments of the object processor 522a and the deltacast coder 524a in the client optimizer 120 are configured to handle processing and/or decoding of the response data, respectively. For example, embodiments of the object processor 522a use features of the deltacast coder 524a, including functionality of the client dictionary 435, to decode the response data. Embodiments of the object processor 522a may then forward the decoded response to the user system 110 (or to other components of the user system 110, where the client optimizer 120 is part of the user system 110). The response may then be used by components of the user system 110. For example, a media object received as part of the response data may be played back through a media player at the user system 110, used to render a web page through the client web browser 514, etc.

In some embodiments, response data (e.g., and/or related identifiers, like fingerprints) is stored in the client dictionary 435. Embodiments of the server optimizer 130 include a client dictionary model 548 (e.g., in the modeler module 532) that is configured to maintain a model of the client dictionary 435. Maintaining the client dictionary model 548 may be accomplished in a number of different ways, including through various synchronization processes, bidirectional communications of acknowledgements and/or other types of notifications, etc. For example, when data is stored in the client dictionary 435, an acknowledgement is communicated back to the server optimizer 130. After the server optimizer 130 receives the acknowledgement, the modeler module 532 may update the client dictionary model 548 accordingly.

It will be appreciated that, while the above description focuses on browser requests and responses to those requests, embodiments of the invention function within many other contexts. For example, embodiments of the communications system 500 are used to provide interactive Internet services (e.g., access to the world-wide web, email communications, file serving and sharing, etc.), television services (e.g., satellite broadcast television, Internet protocol television (IPTV), on-demand programming, etc.), voice communications (e.g., telephone services, voice-over-Internet-protocol (VoIP) telephony, etc.), networking services (e.g., mesh networking, VPN, VLAN, MPLS, VPLS, etc.), and other communication services. As such, the "response" data discussed above is intended only as an illustrative type of data that may be received by the server optimizer 130 from a content source (e.g., a content server 150). For example, the "response" data may actually be pushed, multicast, or otherwise communicated to the user without an explicit request from the user.

For illustrative purposes, traffic over the communications system 500 may be categorized into private-interest traffic and public-interest traffic. Private-interest traffic may include any traffic for which multicasting the traffic to multiple user systems 110 is deemed inefficient. For example, where the traffic is of interest to only one user system 110, or a very small number of user systems 110, it may cost more to set up and process a multicast service flow than to simply unicast the traffic to each interested user system 110. Notably, a user system 110 may act as an intermediate node (e.g., a hub, switch, router, etc.) that forwards information to multiple end users. For example, in a LAN, data may be received at the client-side for all computers in the LAN by a switch, which may then forward the data to appropriate users in the LAN; traffic that is of interest to only one user system 110 may, in fact, be of interest to many users within a LAN serviced by the one user system 110. Alternatively, each user in the LAN may be considered a separate user system 110 running a separate client optimizer 120. As such, the relevant determination may be, from the perspective of the server optimizer 130, how many unicast service flows 525 on the client-server communication link 125 would be needed to unicast the data to all interested users. In contrast to private-interest traffic, public-interest traffic may include any traffic for which multicasting the traffic to multiple user systems 110 is deemed more efficient than unicasting the traffic to each interested user system 110.

Notably, a number of types of traffic may be either private-interest traffic or public-interest traffic, depending on the context. One example is control traffic, which may be used for various types of control of the communications system. For example, control traffic may be used to send control signals to the client optimizer 120 to direct the client optimizer 120 to accept a particular multicast service flow 515. In one embodiment, individual control traffic is sent as unicast service flows 525 to particular client optimizers 120. In another embodiment, certain control traffic is sent to groups of client optimizers 120 (e.g., to some or all of the user systems 110 serviced by a particular spot beam of a satellite communications system) as one or more multicast service flows 515.

Another type of traffic that may be either private-interest traffic or public-interest traffic is media object data. In one embodiment, a first user takes video with a digital camera as part of a videoconference with a second user. The video file may be considered private-interest traffic, as it may be of interest only to the recipient and may never be requested, or even be made accessible, to other users on the communications system 500. In another embodiment, a reporter for CNN takes video with a digital camera as part of a live feed to CNN.com. The video file may be considered public-interest traffic, as it may be accessed by thousands of users on the communications system 500.

Of course, the determination of whether to classify traffic as private-interest traffic or public-interest traffic can be made in a number of ways and may involve many factors. The factors used to make the determination may be derived from the traffic itself or from other sources (e.g., from an evaluation of current link conditions or current system usage, from third-party information, etc.). When analyzing the traffic itself, information may be derived from the header portion and/or the content portion of the datagrams. As noted above, the header portion may provide straightforward sources of information about the communication and/or the content of the communication (e.g., through protocol information, metadata, public or proprietary tags, etc.). However, the information from the header portion may often be limited from the perspective of a man-in-the-middle type of server optimizer 130. For example, relevant header information may be encoded in a proprietary format, may be misleading as to the underlying byte sequence, etc.

The content portion of the traffic received at the server optimizer 130 includes the actual objects (e.g., content file data) being sent to users via respective user systems 110. It will be appreciated that it may be difficult or impossible to obtain certain types of information looking only at the content portion of the traffic datagrams. Of course, various types of data processing (e.g., statistical analysis) can be used to derive information from the byte sequences in the content portion, but it may be difficult to derive high-level information, such as the file type associated with the data. For example, a movie is streamed from a VOD server (e.g., as the content server 150) to a user terminal 110. Proprietary tags in the header portion of the traffic may indicate the name of the movie and the file type for processing at the user's playback device, while the content portion may include only the sequence of bytes that define the actual movie content. When the streaming traffic is intercepted by the server optimizer 130, the server optimizer 130 may be unable to read the header portion of the traffic, and may, therefore, be unable to use that information for making multicast and/or other determinations.

Figure 6:
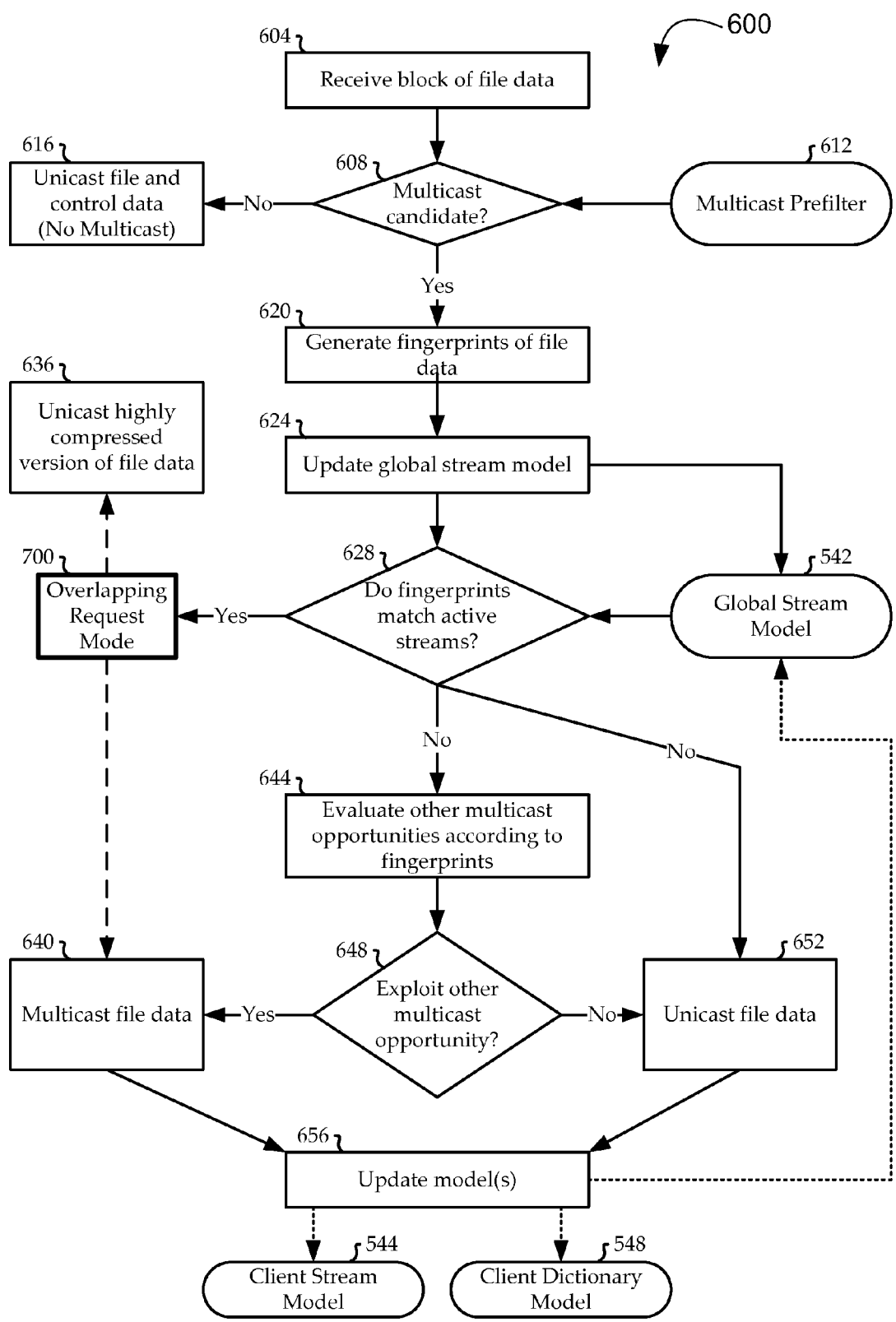
FIG. 6 is a flow diagram of an illustrative method for using deltacasting to handle overlapping content requests over a communications system, according to various embodiments.

Embodiments of the server optimizer 130 process the content portion of the traffic as byte-level data using various deltacasting techniques. FIG. 6 is a flow diagram of an illustrative method 600 for using deltacasting to handle overlapping content requests over a communications system, according to various embodiments. For the sake of clarity, the method 600 is described in the context of the communications system 500 of FIG. 5. It will be appreciated, however, that various modifications may be made to the communications system 500 without limiting the scope of the method 600.

Embodiments of the method 600 begin at block 604 by receiving a block of content data. For example, the content data block (e.g., file data, streaming data, web object data, etc.) may be received as part of traffic intercepted by the server optimizer 130 from a content server 150 over the content network link 135. In some embodiments, at block 608, an initial determination is made as to whether the content data block is a multicast candidate as a function of one or more criteria used to define a multicast prefilter 612. This determination may be made by the object processor 522b.

The multicast prefilter 612 may be defined according to any type of multicast or similar filtering criteria known in the art. In one embodiment, the multicast prefilter 612 is based on the file size of the content data block. For example, only files larger than a certain minimum size may be considered for multicasting. In another embodiment, information from the header portion of the traffic is used by the multicast prefilter 612. For example, the multicast prefilter 612 may be defined to make the initial multicast determination in block 608 according to source IP address, host URL, destination IP address, file type, protocol, HTTP metadata, etc. For example, all video files over a certain size coming from YouTube.com may be considered multicast candidates, while video files being sent as an email attachment to a single recipient may not be considered multicast candidates.

In some embodiments, data relevant to the multicast prefilter 612 is enhanced through trusted source relationships. For example, contractual relationships may be formed with content and service providers to allow visibility by the service providers into the content traversing the network. Embodiments of the trusted source relationships include access to encryption keys (e.g., including master keys), authorization to re-serve or re-host content (e.g., through a mirroring relationship as described more fully below), etc. In the context of these relationships, the server optimizer 130 may be able to use certain types of proprietary metadata to make initial multicasting determinations.

When it is determined at block 608 that the content data block is not a multicast candidate, the content data block (e.g., or at least a portion of the content data block) may be unicast, along with any relevant control data, to the appropriate user system(s) 110. For example, as described above, the content data block may be processed by the object processor 522b and/or the deltacast coder 524b, and sent as a unicast service flow 525 over the client-server communication link 125 via the unicast processors 528. The data may then be received by the client optimizer 120, processed and/or decoded, and forwarded, as appropriate, to components of the user system(s) 110.

When it is determined at block 608 that the content data block is a multicast candidate (e.g., according to the multicast prefilter 612 criteria), the content data block is further processed by the server optimizer 130 to determine if any or all of the content data block will, in fact, be sent over one or more multicast service flows 515. At block 620, a fingerprint is generated (e.g., a fingerprint is calculated). In some embodiments, the fingerprint is generated at block 620 by the deltacast coder 524b of the server optimizer 130.

In certain embodiments, the fingerprint is generated using cryptographic hash functions (e.g., generated by a Message-Digest algorithm 5 (MD5) technique), non-secure hash functions (e.g., generated by a cyclic redundancy check (CRC) technique), or other similar techniques. In other embodiments, the fingerprint can be generated in any way, such that the resulting fingerprint can be used to indicate that one particular byte sequence (or a portion of the byte sequence) matches another particular byte sequence (e.g., or a portion of another byte sequence). Embodiments of dictionary coding (e.g., particularly delta coding) and related techniques are described in more detail in U.S. Pat. No. 8,010,705, entitled "METHODS AND SYSTEMS FOR UTILIZING DELTA CODING IN ACCELERATION PROXY SERVERS", filed on Jun. 3, 2009, which is incorporated herein by reference for any and all purposes.

In some embodiments, the fingerprint is essentially a compressed version of the byte sequence. In other embodiments, the fingerprint is a checksum, hash, or other technique applied to some or all of the object data. This fingerprint may then be compared to other fingerprints to find a match. Notably, embodiments may ultimately seek multicast opportunities and/or other opportunities for optimization of the communications system 500. As such, it may be inefficient to generate fingerprints on very small blocks of data (e.g., at high densities), since it may not be efficient to exploit opportunities where only small blocks are identified as matches. Further, decreasing the size of blocks may increase the size of the dictionary. Some embodiments, therefore, generate fingerprints at a particular density determined to be efficient according to parameters of the communications system 500 or types of data.

It is worth noting that the traffic may include more than just the content data block for which a fingerprint is being generated, or the traffic may include multiple different content data blocks for which fingerprints are generated. In one example, a media file is received at the object processor 522b of the server optimizer 130. The object processor 522b and/or the deltacast coder 524b may strip off data (e.g., header information) that is not needed for generating the fingerprint at block 620. In another example, an email is received having the media file as an attachment. The object processor 522b and/or the deltacast coder 524b may perform an extra step of stripping off the email data, in addition to the header and other data, to effectively isolate the byte sequence for fingerprint generation at block 620.

Embodiments of the method 600 use the fingerprints generated in block 620 to identify and/or exploit deltacasting opportunities for shared content session streams. As described below, identifying the shared content deltacasting opportunities may involve checking whether the requested data is part of an active content stream currently being communicated to another user. To facilitate this determination, embodiments include a global stream model 542 configured to maintain a model of all data blocks intercepted by the server optimizer 130 for any active stream (e.g., any currently-active unicast service flow 525 or multicast service flow 515). For example, the global stream model 542 may store the actual data blocks, fingerprints of the data blocks, and/or some other representation. At block 624, the global stream model 542 is updated to reflect the file data received in block 604.

As used herein, "stream," "session stream," and similar terminology refers to data for a client session associated with a single content stream or item. For example, if a video is downloaded over a single TCP connection, the data associated with this connection is the session stream. Similarly, if a client session is viewing a live broadcast via UDP, the content stream might be identified as all traffic using the same source/destination IP/port combination. Notably, a "stream" may include any type of content being communicated, and is not restricted to so-called "streaming" data formats or protocols. In some cases, a session stream may involve multiple TCP connections, such as when a download uses certain peer-to-peer protocols. A client session may have multiple concurrent session streams, such as when a user is downloading two different videos at the same time. Each session stream is handled independently, so that each could potentially participate in different shared content streams.

It is worth noting that the global stream model 542 may not necessarily indicate what is stored in any client dictionary 435. For example, in some embodiments, the global stream model 542 is updated substantially as data blocks are received for active streams (e.g., in block 624), rather than waiting for confirmation from a client optimizer 120 that the data block was successfully received at the client-side of the communications system 500. Further, various data management techniques may be used for storage of content stream data. For example, certain types of data may be stored in temporary storage, in particular bins of a client dictionary 435, in more permanent storage, etc. Embodiments of the modeler module 532 of the server optimizer 130 may account for these different types of content stream storage by maintaining different types of models. For example, in addition to the global stream model 542, the modeler module 532 may maintain client stream models 544 representing data currently being communicated to a particular client on an active client session stream, client dictionary models 548 representing data currently stored in a particular client's client dictionary 435, etc.

In some embodiments, the entries in the global stream model 542 include fingerprint and other identification information about the block, as well as an identifier specifying the "owner" of this block. For example, if a multicast data block is part of a shared content stream (e.g., determined as described below), the owner may be specified via a Content Stream ID, which is a unique identifier for each shared content stream in process. If the data block is not part of a shared content stream, the owner may be specified as an identifier for the client session stream that generated the data block.

Further, entries may remain in the global stream model 542 for as long as the owner remains active. For example, a shared content stream may remain active as long as any client sessions are participating in the shared content stream. This participation might be determined as having an active TCP connection that has previously used data blocks from the shared content stream. In some embodiments, when a shared content stream terminates, all blocks associated with this shared content stream may be removed from the global stream model 542. If a data block is never made part of a shared content stream (e.g., it is added to the global stream model 542 in block 624, but is never made part of a shared content stream, as described below), it may be removed when the client session stream that added the entry is no longer active. For example, this may occur when the TCP connection that downloaded the stream has been closed. The methods used to determine the lifetime of entries in the global stream model 542 may be optimized in various ways as needed to handle session streams that use multiple TCP connections or non-TCP protocols, or to detect when entries are part of a live content stream where it is not necessary to maintain all entries for the lifetime of the shared content stream.

At block 628, a determination is made as to whether the fingerprints indicate a match with a currently active stream (e.g., according to the global stream model 542). A match determined in block 628 may indicate that the requested content (e.g., or substantially similar content) is currently being communicated to other users at substantially the same time, thereby presenting a deltacasting opportunity. Notably, as described above, it may be desirable to exploit deltacasting (e.g., and/or other multicasting) opportunities where at least a portion of the forward link is shared by the users in the multicast group. As such, the determination in block 628 may be limited to whether the fingerprint indicates matching data in an active stream for which a shared forward link can be exploited. In some embodiments, this is implemented by having separate global stream models 540 for groups of users having shared forward links. In certain embodiments, the global stream models 540 may be further categorized in other ways, for example, according to modcode point.

In some embodiments, the determination in block 628 goes beyond finding a single match between the fingerprint and an entry in the global stream model 542. In one embodiment, matches are recorded, and a deltacasting opportunity (e.g., a shared content stream exploitation opportunity) is identified only when a certain number and/or type of match is reached. For example, a single matching block may generate false positives, indicating deltacasting opportunities in incorrect or inefficient circumstances. Instead, the determination at block 628 may wait for a condition, such as seeing two matches in a row. In another embodiment, the determination at block 628 is affected by the determination at block 608. For example, certain types of data (e.g., certain file types) may be considered possible multicast candidates according to the multicast prefilter 612 and the associated determination in block 608, while being a file type that is highly unlikely to be part of a shared content stream. These and/or other types of techniques may be used to increase the efficiency of the determination in block 628.

Figure 7:
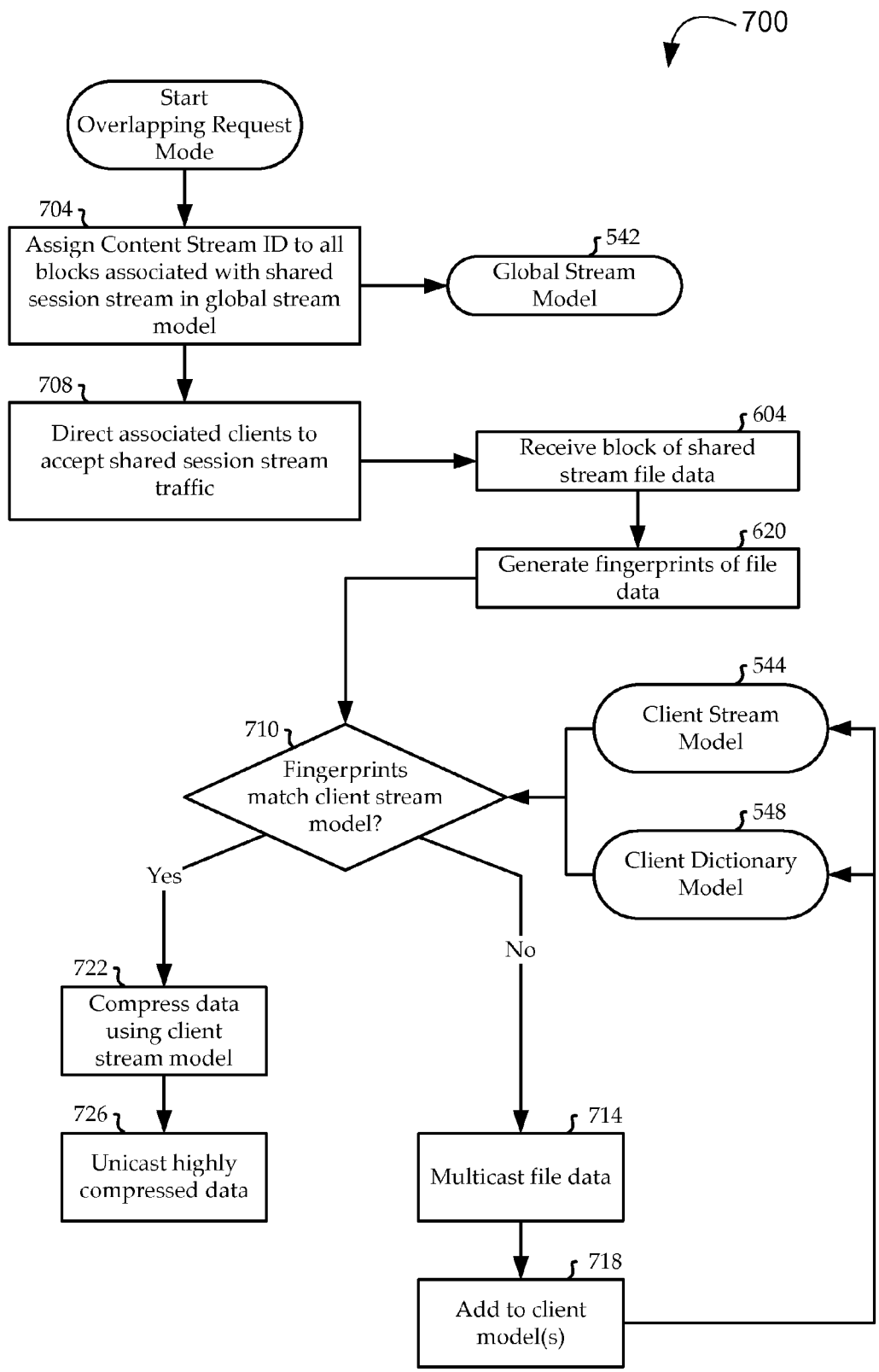
FIG. 7 shows a flow diagram of a overlapping request mode method, according to various embodiments.

If the determination in block 628 indicates a deltacasting opportunity, the method 600 may enter an overlapping request mode, as indicated by block 700 and as described more fully below with reference to FIG. 7. It is worth noting that, as described above, multiple scenarios may exist in which a match is found at block 628. In one type of scenario, the "live content" context, multiple clients may request substantially the same content at substantially the same time. For example, while a first client watches a live broadcast, a second client tunes into the broadcast, such that both client are effectively watching the same content at substantially the same time. Embodiments of system and methods for handling these types of scenarios are described in U.S. Pat. No. 8,639,744, entitled "DELTACASTING FOR LIVE CONTENT", filed on Jan. 8, 2010, which is incorporated herein by reference for any and all purposes.

In another type of scenario, the "overlapping request" context, multiple clients may request substantially the same content at different, but overlapping times. For example, while a first client is streaming a movie, a second client requests the same movie, where the two clients expect to watch the movie from different playback positions. Some embodiments may treat this second type of scenario differently from the treatment of the first type of scenario. However, embodiments of the method 600 may further detect which scenario is occurring, and may handle the requests accordingly.

In the example above, while a first client is streaming a movie, a second client requests the same movie. The second client begins watching the movie from the beginning, while the first client continues to watch the movie from some other location, say one hour into the movie. This may be treated as an overlapping request to be handled according to FIG. 7 below. Shortly thereafter, the second client then fast-forwards playback to substantially the playback location currently being watched by the first client. The method 600 may begin treating the scenario as a "live content" request (e.g., to be handled according to the method 700 of FIG. 7 of U.S. Pat. No. 8,639,744, entitled "DELTACASTING FOR LIVE CONTENT," incorporated above). Later, the second client again fast-forwards playback to a playback location beyond that currently being watched by the first client. The method 600 may begin treating the scenario again as an overlapping request, however with the first client now lagging the second client, according to FIG. 7.

As discussed more fully with reference to FIG. 7 below, entry into the overlapping request mode of block 700 may result in multicasting the file data in block 640 or unicasting a highly compressed version of the file data in block 636. If the determination in block 628 indicates that there is no deltacasting opportunity (e.g., that it would be inefficient to set up and manage a shared content stream), the method 600 may proceed in a number of ways. In one embodiment, when no deltacasting opportunities are identified, the file data is unicast to the requesting user in block 652. In other embodiments, other multicast opportunities may be evaluated at block 644, for example, according to the fingerprints generated in block 620. In certain embodiments, the multicast opportunities evaluated in block 644 include other deltacasting opportunities described in U.S. patent application Ser. No. 12/651,909, titled "DELTACASTING," which is incorporated above.

Some embodiments of additional deltacasting opportunities include comparing the fingerprint generated in block 620 with blocks from a client dictionary model 544 to determine whether there is a match. For example, even where the response data does not match blocks of a currently active stream (i.e., no match is found at block 628), the server optimizer 130 may use the client dictionary model 548 to determine whether the byte sequence is already stored in the requesting client's client dictionary 435. In that case, at block 652, all or relevant portions of the content data block may be compressed using the dictionary model (e.g., dictionary indexes) and unicast to the client. For example, the content data block is compressed by the server-side deltacast coder 524b and communicated as a unicast service flow 525 to the client optimizer 120 via the unicast processors 528.

In some embodiments, the method 600 evaluates additional multicast opportunities at block 644 even where a match is found at block 628. In one example, a deltacasting opportunity is identified at block 628, and further opportunities for using the resulting multicast service flow are found at block 644 (e.g., by multicasting the data on an additional multicast stream, by adding additional (e.g., non-requesting) users to the multicast group for the shared content stream, etc.). In another example, matches are found at block 628, but it is determined not to enter overlapping request mode; and, instead, to create a different type of multicast.

When multicast opportunities are evaluated in block 644, a determination may be made at block 648 as to whether multicast opportunities should be exploited. For example, even where a multicast opportunity exists, it may be inefficient to spend the resources to exploit the opportunity (e.g., to set up a multicast service flow 515). Notably, a similar type of determination is described above with reference to block 608. Further, multicast opportunities may be evaluated and fingerprint generation can be tailored in various ways depending on the types of opportunities being evaluated (e.g., the fingerprint may, itself, be a sequence of bytes or part of a more complex system of determining the associated byte sequence).

If a determination is made at block 648 that either no multicast opportunities exist, or that the multicast opportunities should not be exploited, the content data block data and/or any related control data is unicast at block 652, where appropriate. For example, if the content data block is requested by one user and no multicast opportunities exist, the content data block data may be unicast to the requesting user. In some embodiments, unicasting the data at block 652 involves communicating the data as a unicast service flow 525 to the client optimizer 120 via the unicast processors 528.

If a determination is made at block 648 that a multicast opportunity exists and should be exploited, the content data block may be multicast to one or more clients at block 656 (e.g., including the requesting client, where appropriate). In some embodiments, multicasting the data at block 656 involves communicating the content block data over one or more multicast service flows 515 to the client optimizer 120 via the multicast processors 530. In certain embodiments, the fingerprint generated in block 620, or another representation of the data (e.g., the byte sequence itself, a compressed version or a portion of the byte sequence, or a different type of fingerprint) is stored at the server-side for later use by the communications system 500. For example, storage of relevant information may be useful in generating or identifying future multicast opportunities, tracking and/or characterizing network usage, prefetching, etc.

It will be appreciated that, in some embodiments, multicasting or unicasting data is implemented in different ways. For example, in the satellite communications system 200 of FIG. 2, some or all of the receivers (e.g., user systems 110) in a spot beam 235 may inherently be capable of receiving at least a portion of any traffic being sent over the spot beam 235 by virtue of being tuned to the appropriate carrier, able to receive data at the current modcode point, etc.; effectively, the satellite communications system 200 broadcasts everything over the air. As such, as discussed above with reference to FIG. 1B, unicasting or multicasting to one or more user systems 110 may, in fact, involve broadcasting the data over the satellite link and also broadcasting control data to direct receivers to either accept or ignore relevant portions of the broadcast data.

In one illustrative embodiment, content is broadcast over a satellite link with a stream identifier that designates it as a multicast stream. Control data is also sent directing a subset of user systems 110 to "listen" to the multicast stream (e.g., to accept, rather than ignore, data with that stream identifier as it is received). In effect, this creates a multicast group of the interested users. In different embodiments, the control data may be communicated to the multicast group either as respective unicast service flows 525 to each client via the unicast processors 528 or as part of a multicast control channel sent over a multicast service flow 515 via the multicast processors 530. It will be appreciated that, for the sake of bandwidth efficiency, embodiments may send the control data over the multicast control channel. For example, all the user systems 110 may be constantly listening to the multicast control channel to find out (e.g., among other things) which streams they should accept. Of course, other implementations are possible according to various embodiments for unicasting or multicasting the data over various unicast service flows 525 and/or multicast service flows 515 to the client optimizer(s) 120.

Once the data is received at the client optimizer 120, it may be stored at the client-side (e.g., blocks of the data may be stored and indexed by the client dictionary 435). In certain embodiments, storage in the client dictionary 435 ultimately causes a record of the data to be reflected at the server optimizer 130 by updating a client dictionary model 548 (e.g., through synchronization by the modeler module 532). When it is determined in block 648 that the data will be multicast in block 656 (e.g., and/or when the data is determined to be unicast in block 652), the data may be compressed and/or otherwise coded before it is sent over the client-server communication link 125. In one embodiment, the data is zip coded prior to being sent over the client-server communication link 125. When the zipped data is received at the client optimizer 120, the data is added to the client dictionary 435.

In some embodiments, when the data is unicast or multicast to the client, one or more models may be updated in block 656. For example, one or more client dictionary models 548 and/or client stream models 544 may be updated to reflect communication of the content traffic to associated clients. The global stream model 542 may also be updated at this point. The models can be updated at any practical point in the method 600 without departing from the scope of the invention. For example, the updating of the global stream model 542 shown at block 624 may alternatively be performed at block 656.

It will now be appreciated that embodiments allow usage of fingerprints, generated at the byte-level of the content portion of traffic traversing the network, to identify and/or exploit deltacasting and/or other multicasting opportunities. As discussed above, when a determination is made at block 628 that a deltacasting opportunity is available due to detecting overlapping requests (e.g., at block 628), the method 600 may enter a overlapping request mode per block 700. FIG. 7 shows a flow diagram of a overlapping request mode method 700, according to various embodiments.

Embodiments of the method 700 begin at block 704 by updating the global stream model 542 to reflect a new shared content stream. As discussed above, determining to enter the overlapping request mode may indicate that data requested as part of one session stream has been identified as matching data already being communicated to at least one other client on another session stream, and that it is desirable to communicate subsequent data from both clients as a shared content stream to all associated clients. As such, related session streams may be adjusted to reflect collapsing the streams into the new shared content stream, which may be identified by a Content Stream ID (e.g., a substantially unique identifier).

In some embodiments, a Content Stream ID is generated whenever a new client session stream begins (or at some other similar time), and all content data in that client session stream is flagged with that Content Stream ID in the global stream model 542 (e.g., and in the associated client stream model 544). When a later stream is identified as requesting matching data and joins the shared content stream, any associated data from either client session that is added to the models is similarly flagged with the Content Stream ID. In other embodiments, prior to generating the shared content stream, content on a client stream is flagged with a session identifier or some other identifier. When the overlapping request mode is entered, the Content Stream ID is generated and associated with all entries in the global stream model 542 for the client session stream that is being converted into a shared content stream, as well as for any later session stream for which a match is identified (e.g., a client session that is added to the shared content stream). Any subsequent blocks received on any participating session streams may similarly be associated (e.g., tagged) with the Content Stream ID.

In addition to initiating a new shared content stream, clients may have to be made aware of the shared content stream. In some embodiments, at block 708, the method 700 directs clients participating in the shared content stream to accept traffic associated with the shared content stream. For example, a unicast message is sent to both streams (i.e., the converted stream and the new, matching stream) directing them to store any multicast blocks associated with this Content Stream ID. As discussed above, some embodiments may assume that the data is received and stored by a client by maintaining a client stream model, while other embodiments may maintain a client dictionary model 548 that is updated to reflect storage in the client dictionary 435 only upon confirmation (e.g., receipt of an acknowledgement message).

It will be appreciated that blocks being received as part of any participating session streams may now be associated with the shared content stream and processed according to the remaining blocks of the method 700. At block 604, a block of file data associated with the shared content stream is received. Of course, block 604 of FIG. 7 may be implemented substantially as block 604 of FIG. 6. For the sake of clarity, block 604 of FIG. 7 is shown as an illustrative case in which the block of file data received is one identified as part of the shared content stream (e.g., carrying the Content Stream ID).

As in the method 600 of FIG. 6, after the data is received at block 604, a fingerprint of the data block may be generated at block 620. It is worth noting that embodiments of the method 700 may skip blocks shown in the method 600 of FIG. 6. For example, it may not be necessary to check whether a received data block is a multicast candidate when it is part of the shared content stream, since association with the shared content stream may make the data blocks inherently multicastable. In some embodiments, however, additional processing is performed. For example, even when the data blocks are identified as part of the shared content stream, the fingerprints may be compared against a requesting client's client dictionary model 548. A match may indicate that the data block was previously communicated to the client as part of a previous session (e.g., a pre-positioning operation, a previous download, etc.), and that the client dictionary 435 entries may allow the data blocks to be unicast using high compression.

The method 700 may proceed at block 710 by determining whether the data received at block 604 matches blocks in one or more client models, for example, the client stream models 544 and/or the client dictionary models 548 for one or more of the clients participating in the shared content stream. The determination is made according to the fingerprints generated at block 620.

It is worth noting that the data received at block 604 may be part of any participating client session stream (e.g., in response to a request from any of the participating clients). For example, the determination at block 710 may depend on whether this client session stream is the first session in the multicast group to receive the data block at the server optimizer 130. For example, jitter windows, latencies, traffic, and/or other factors may cause different client sessions in the multicast group to receive the data blocks in different orders, at different times, etc. Further, because of the overlapping request context, it may be assumed that certain clients will be receiving the data for use at different times and may handle (e.g., store) the data differently.

If the client session stream is the first to receive the data block for the shared content stream, the data block may not be represented in the respective client stream model 544, and the determination in block 710 may indicate that there is no match. As such, it may be desirable to provide the data block to all active clients in the associated multicast group by multicasting the data in block 714. Further, all the active client stream models 544 and/or the client dictionary models 548 are updated (e.g., after confirmation is received of storage in the client dictionary 435) in block 718 to reflect that the data was multicast to those clients.

At this point, all the active client stream models 544 include representations of that data block. As such, when the next client session receives the same data block and reaches block 710 of the method, the data block will be represented in the respective client stream model 544, and the determination in block 710 will indicate the match. Embodiments use the client stream model 544 in block 722 to compress the file data. In block 726, the compressed (e.g., highly compressed) data is unicast to the associated client over the client's session stream.

From the perspective of each client participating in the shared content stream(s), portions of the requested content may be received substantially in parallel over multiple session streams. For example, a second client requests a movie while it is being streamed by a first client. Both clients' session streams may be associated with the Content Stream ID, but this may not mean that all streams will be collapsed into a single multicast stream. Rather, the remainder of the movie being watched by the first client may effectively be multicast on one session stream to the second client for pre-positioning (e.g., anticipatory storage) in the second client's client dictionary 435. Meanwhile, the second client may also receive a unicast or multicast of the "missed" portion of the movie (e.g., the portion of the movie already watched by the first client prior to the second client's request) on a separate session stream.

Notably, some embodiments treat all clients substantially indiscriminately, regardless of the order of content requests, etc. For example, in the example above, the first and second clients' session streams are both associated with the Content Stream ID. If the second client watches portions of the movie that were previously skipped by the first client (e.g., advertisements, previews, opening credits, etc.), these portions of the content may be identified by the method 700 as part of the shared content stream and not matching data in the first client's client dictionary 435 (e.g., according to the first client's client dictionary model). As such, the data may be multicast to both clients and/or stored in the first client's client dictionary 435, even though the first client may have long since passed that portion of the movie. This may facilitate a number of functions, such as pre-positioning those blocks for future viewing of the movie by the first client or for rewinding of the movie by the first client.

Of course, in some embodiments, the session streams and associated data may be tagged differently to not treat all requesting clients indiscriminately. In certain embodiments, it may be assumed that a client will never again watch an earlier portion of the content. For example, this assumption may be based on technological limitations of the system, legal and/or contractual relationships (e.g., a digital rights management agreement may prohibit storage and/or future access of the content substantially after that portion of the content has been passed in playback), etc. In other embodiments, the decision whether to store anticipatory data (e.g., data being pre-positioned) may be partially or completely made by the client (e.g., components of the client optimizer 120). For example, when the first client receives multicast data for a portion of the movie that has been skipped, the associated deltacast coder 524a may determine not to store the data in the client dictionary 435, the multicast processor 530a may determine not to accept the data, etc.

It is worth noting that a separate client stream model 544 may be maintained for each active client session, and a global stream model 542 may be maintained for all client sessions (e.g., those sharing forward link capacity), and each of these models may be different. These different models may be used to account for the fact that clients may not listen to all multicast traffic at all times (e.g., unless the client optimizer 120 determines that it should subscribe to the service flow, the server optimizer 130 directs the client to subscribe to the service flow, etc.). For example, each client session may join the shared content stream (e.g., tune into the programming) at different times, thereby having a different set of data blocks represented in their respective client stream models 544 (e.g., only those data blocks communicated on the shared content stream after that client joined the shared content stream). Having separate client stream model 544 helps ensure that client session streams do not try to use data blocks for compression when those blocks have not previously been communicated to the respective client. Similarly, if the client session stream is not part of a shared content stream yet, there may be no relevant client stream model 544 to check against. As such, as mentioned with reference to FIG. 6, the data blocks are added to the global stream model 542 to support identifying shared content stream deltacasting opportunities. For example, if the received data block is not in the global stream model 542, all active client stream models 544 and the global stream model 542 are updated to reflect the data block and its association with the shared content stream. Embodiments operate atomically, to the extent possible, to insure that a data block is added only once, even when two client sessions receive the same block at substantially the same time.

Of course, as discussed above, some embodiments do not have client stream models 544 at all. For example, in the overlapping requests context, it may be assumed that enough time will pass between anticipatory receipt of data from a shared stream and interaction with that data (e.g., watching that portion of the content) that relevant client dictionary models 548 will be updated (e.g., that confirmation of storage in the client dictionary 435 will be received and processed). Use of the client dictionary model 548 instead of the client stream model 544 may yield certain advantages, such as allowing for confirmation that the data is stored in the client dictionary 435 before attempting to use those stored blocks for compression. However, when the timing between the anticipatory receipt of data and interaction with that data decreases beyond some threshold level (e.g., substantially the time it takes for confirmation of storage in the client dictionary 435 to be received, and for the client dictionary model 548 to be updated accordingly), deltacasting opportunities may be missed without also maintaining a client stream model 544.

In some embodiments, client sessions can decide whether to commit the data blocks to their respective permanent client dictionaries. For example, the client may decide whether to record broadcast television. If so, messages may be sent to the server system 220 to add the blocks to the client dictionary models 548 in the same way as may be done for blocks that are not part of a shared content stream. If not, blocks may be stored only temporarily and removed from local client storage once the client leaves the shared content stream (or at some other useful time). In certain embodiments, the client session can also remove blocks from its client dictionary (e.g., from a temporary shared content stream list, or some other bin of the client dictionary 435) by uploading a message to the server system 220. Embodiments may wait to remove the data block from the client dictionary 435 until a message (e.g., ack) is received from the server system 220 indicating the block has been removed from the client dictionary model 548 on the server system 220. For example, this may prevent the server 130 optimizer from compressing data using a dictionary page that is not available to the client optimizer 120.

Notably, client sessions can withdraw from the shared content stream at any point. For example, a TCP connection to a content server 150 may be closed (or the last connection may be closed, if a shared content stream is using multiple connections). In some embodiments maintaining client stream models 544, when a session leaves the shared content stream, its respective client stream model 544 is deleted. Further, in certain embodiments, a message is sent to the client notifying that data blocks in a temporary shared content stream storage (e.g., not committed to a more permanent location, for example in the client dictionary 435) should be removed. The client session may then resume normal processing according to the method 600 of FIG. 6. In some embodiments, the shared content stream ends when no session streams remain active in it. At that time, all entries in the global stream model 542 and/or client stream models 544 associated with the shared content stream can be removed and/or dissociated with the Content Stream ID.

Various types of storage management may be used according to other embodiments. In one embodiment, entries remain in the client stream model 544 for as long as the respective owner remains active, and the entries may be removed upon termination of the client session stream. In another embodiment, entries are removed from the client stream model 544 upon termination of the session stream, but they remain in (e.g., or are added to) another storage location. For example, the modeler module 532 may maintain a set of blocks previously seen in now-inactive streams for some duration of time. In still other embodiments, as discussed above, lifetimes of entries in models, dictionaries, or other storage locations may be optimized, as needed, to handle session streams that use multiple TCP connections or non-TCP protocols, to detect when entries are part of a live content stream where it is not necessary to maintain all entries for the lifetime of the shared content stream, etc.

Figure 8A:
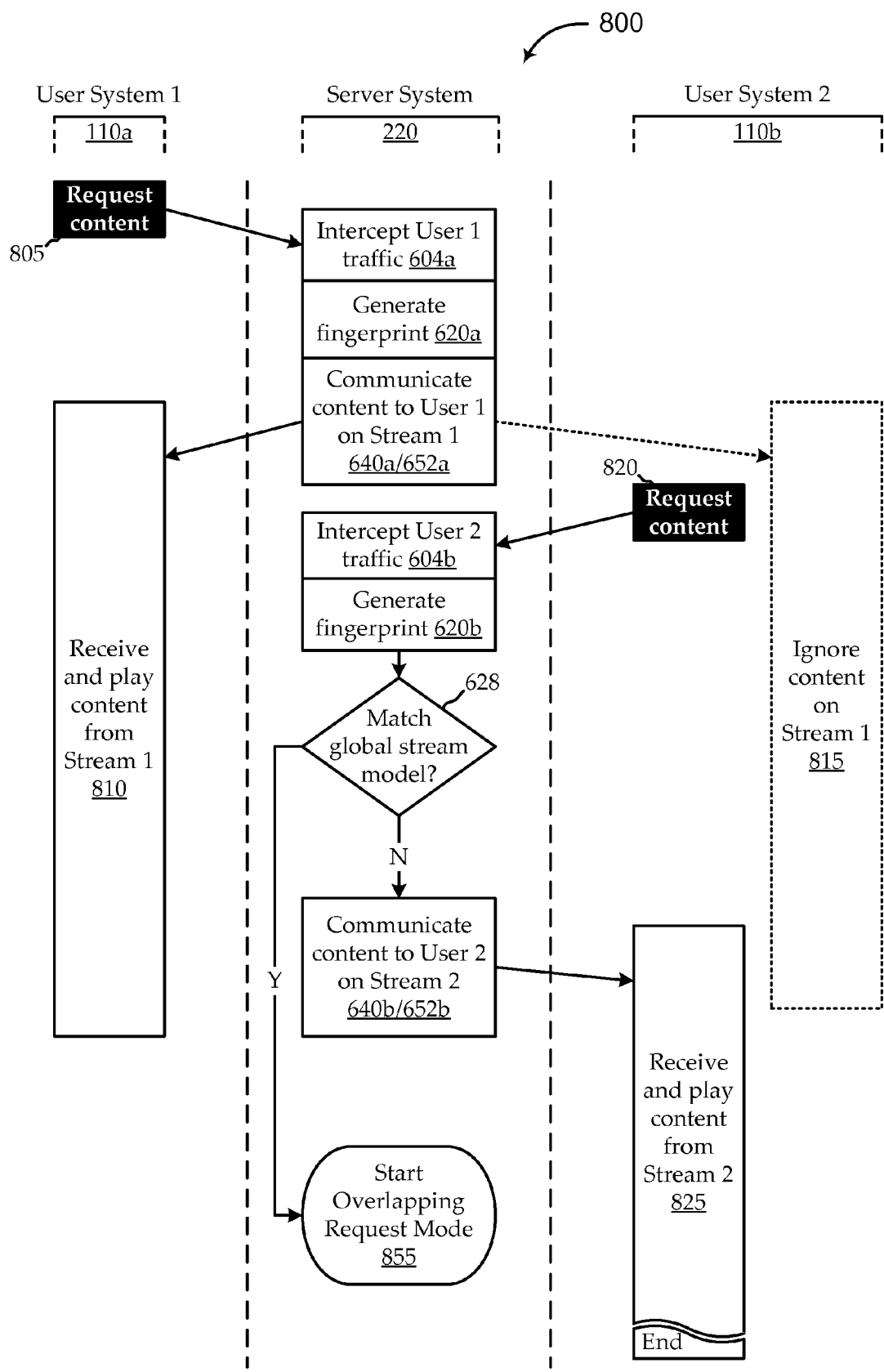
FIG. 8A shows a first portion of an illustrative flow diagram for handling multiple overlapping requests for the same content, according to various embodiments.

It will be appreciated that many scenarios are possible by which overlapping requests may occur. FIG. 8A shows a first portion of an illustrative flow diagram 800 for handling multiple overlapping requests for the same content, according to various embodiments. Two user systems 110 (e.g., viewers) capable of sharing forward link capacity (e.g., on the same spot beam) request substantially the same content at different, but overlapping, times from a server system 220. The requests are satisfied through deltacasting techniques described above. In some embodiments, the user systems 110 viewers are each associated with a client optimizer 120, and each client optimizer 120 is in communication with a server optimizer 130 over an optimizer tunnel 105, as described above with reference to FIG. 1B.

The method 800 begins when a first user associated with a first user system 110a requests content at block 805. The traffic associated with the first user's request (e.g., the response traffic) is intercepted by the server system 220 (e.g., the server optimizer 130) at block 604a. At block 620a, a fingerprint is generated to characterize the intercepted content. Blocks 604a and 620a of FIG. 8A may be implemented substantially as blocks 604 and 620 of FIG. 6, respectively.

In the illustrative method 800 of FIG. 8A, it is assumed that the first user is the first to request the content, such that the content is not part of a shared content stream at this point. In particular, it is assumed that a second user associated with the second user system 110b is not "listening" to the content stream. At block 640a/652a, the content is communicated to the first user on a first session stream either as a unicast or a multicast, as described above with reference to blocks 640 and 652 of FIGS. 6 and 7. At block 810, the first user system 110a receives the content via the first session stream and accepts the content (e.g., for playback). At block 815 (substantially at the same time), the second user system 110b ignores the content being communicated via the first session stream. Note that the user systems 110 are assumed to share forward link capacity. As such, the second user system 110b may receive the content at block 815 (e.g., it may be tuned to the same spot beam or connected to the same shared physical link infrastructure as the first user system 110a), even though it may ultimately ignore or reject the content.

At some later time, in block 820, the second user system 110b requests content. The traffic associated with the second user's request (e.g., the response traffic) is intercepted by the server system 220 (e.g., the server optimizer 130) at block 604b, and a fingerprint is generated to characterize the intercepted content at block 620b. Blocks 604b and 620b of FIG. 8A may be implemented substantially as blocks 604 and 620 of FIG. 6, respectively.

In block 628 (e.g., as discussed with reference to block 628 of FIG. 6, above), the method 800 determines whether the fingerprint generated at block 620b indicates a match with data represented in the global stream model. If there is no match, this may indicate that the data requested by the second user system 110b is not part of a content stream currently being communicated to the first user system 110a (e.g., or to any other user configured to share forward link capacity). In this case, at block 640b/652b, the content is communicated to the second user on a second session stream either as a unicast or a multicast, as described above with reference to blocks 640 and 652 of FIGS. 6 and 7.

At block 825, the second user system 110b receives the content via the second session stream and accepts the content (e.g., for playback). In some embodiments, the first user system 110a also receives the second-requested content via the second session stream and may or may not ignore the content according to determinations discussed above. In the event that a match is detected at block 628, the method 800 may start an overlapping request mode at block 855. In some embodiments, the overlapping request mode is implemented substantially as the overlapping request mode illustrated by the method 700 of FIG. 7.

Figure 8B:
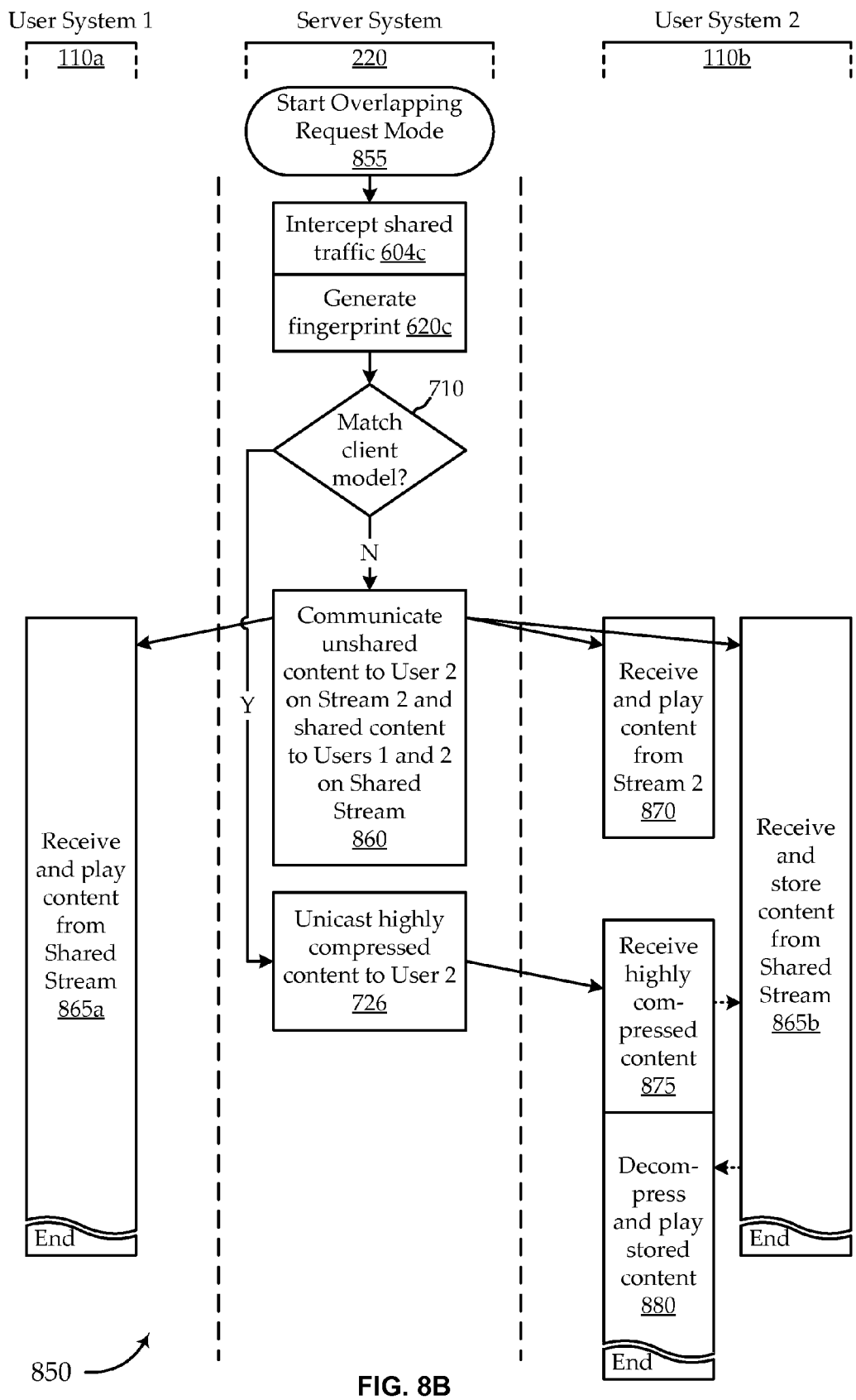
FIG. 8B shows a second portion of an illustrative flow diagram for handling overlapping requests for the same content, according to various embodiments.

FIG. 8B shows a second portion of an illustrative flow diagram 850 for handling overlapping requests for the same content, according to various embodiments. Embodiments of the method 850 are described as a second portion of the method 800 of FIG. 8A. It will be appreciated that methods other than those illustrated by the method 800 of FIG. 8A can be used to determine whether to enter the overlapping request mode shown as the method 850 of FIG. 8B. As such, the method 800 of FIG. 8A should not be construed as limiting the method 850 of FIG. 8B.

After the overlapping request mode is determined to begin at block 855, content identified as part of the shared content stream (e.g., carrying the Content Stream ID) is received at block 604c and fingerprints are generated at block 620c. Blocks 604b and 620b of FIG. 8B may be implemented substantially as blocks 604 and 620 of FIG. 7, respectively. At block 710, a determination is made as to whether the content matches a client model. For example, the matching client model may be a client stream model, a client dictionary model, etc., as described above with reference to block 710 of FIG. 7.

Detecting a match at block 710 may indicate that the content has previously been communicated to the second user system 110b (e.g., this is the second time the content is being received as part of the shared content stream, or the content was stored previously by the second user system 110b as part of some other operation). In these cases, the content may be unicast as highly compressed content to the second user system 110b in block 726. Block 726 may be implemented substantially as block 726 of FIG. 7 described above. At block 875, the highly compressed content may be received by the second user system 110b. Because the content was already determined to be stored locally at the second user system 110b (e.g., in the respective client dictionary), the locally stored content can be used in block 880 to decompress the received compressed content for use (e.g., playback) by the second user system 110b.

Failing to detect a match at block 710 may indicate that, while the content is part of a shared content stream, it has not yet been communicated to the second user system 110b (e.g., this is the first time the content is being received as part of the shared content stream, and the second user system 110b has not previously stored the content as part of another operation). As discussed above, even when data is associated with the shared content stream, the data may not actually be shared data. For example, a second-requesting client may receive some data (e.g., the remainder of the content being downloaded by the first-requesting client) anticipatorily over a shared content stream, while receiving other data (e.g., the missed portion of the content) on a separate content stream. As shown in block 860, shared content is communicated to both user systems 110 over a shared content stream, while unshared content is communicated to the second user system 110b over a second session stream. In some embodiments, the shared and unshared content are multicast according to block 714 of FIG. 7.

At block 865, both user systems 110 receive the shared content from the shared content stream. If it is assumed that the second user system 110b is receiving the content anticipatorily while the first user system 110a receives the content for substantially immediate use (e.g., playback), the second user system 110b may store the shared content (block 865b) while the first user system uses the shared content (block 865a). It will be appreciated that the user systems 110 may store and/or use the shared content in other ways without departing from the scope of the invention (e.g., the first user system 110a may also store the content). At substantially the same time, the second user system 110b may receive the unshared content via the second session stream at block 870 (e.g., for substantially immediate use).

When playback of the content by the second user system 110b reaches a position where data to satisfy the playback is already stored locally, the decision block 710 will now find a match. As such, rather than re-downloading the data completely, the remaining data may be communicated in a highly compressed form in block 726, and received and decompressed in blocks 875 and 880, as described above. An illustrative example of this type of use is shown in FIG. 9.

Figure 9:
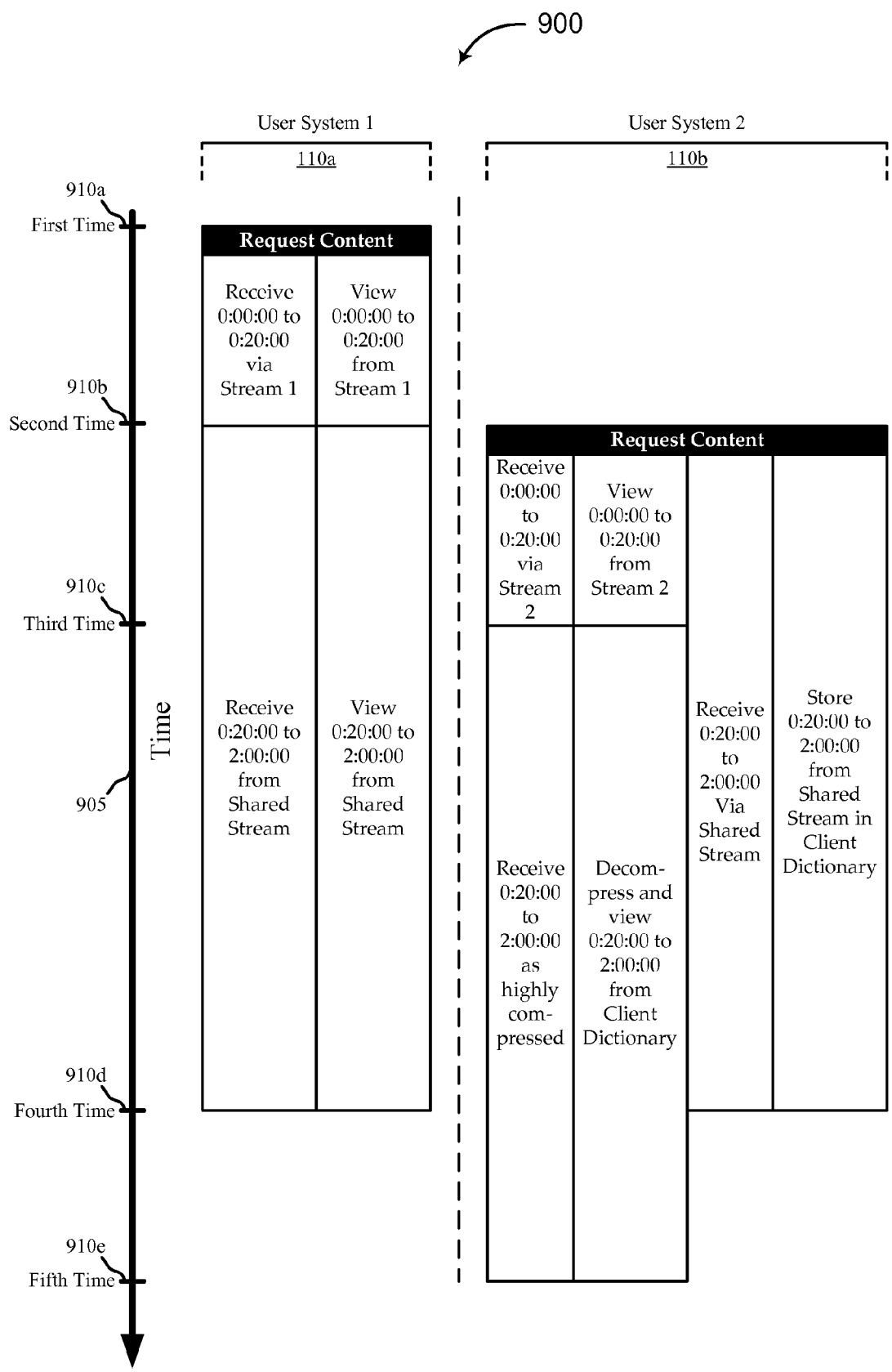
FIG. 9 shows an illustrative flow diagram for handling overlapping requests for the same streaming movie, according to various embodiments.

FIG. 9 shows an illustrative flow diagram 900 for handling overlapping requests for the same streaming movie, according to various embodiments. Two user systems 110 (e.g., viewers) capable of sharing forward link capacity (e.g., on the same spot beam) request substantially the same content at different, but overlapping, times. The requests are satisfied through deltacasting techniques described above.

The illustrative scenario of FIG. 8 is described with reference to the satellite communications system 200 of FIG. 2. For example, each viewer requests content from a content server 150, using a CPE 260 in communication with a base station 215 over a shared spot beam 235 of the satellite communications system 200. It will be appreciated that the description with reference to the satellite communications system 200 is intended only as an example, and should not be construed as limiting the scope of the invention.

At a first time 910a shown on a timeline 905 (e.g., 0:00:00), a first viewer requests content (e.g., the live content from the content server 150 (e.g., via a network 140). For the sake of illustration, the first viewer tunes in to a movie to be streamed being broadcast over the Internet to a television channel by submitting the request to his television computer by way of a remote control device. The television (e.g., CPE 260a) communicates the request to its respective user terminal 230a in communication with a respective user antenna 225a. The request may then be communicated to the appropriate base station 215 via the satellite 205 and antenna 210. As described above, the client-side components may be considered as part of a user system 110, the server-side components may be considered as part of a server system 220, and the user systems 110 and server system 220 may be configured to implement an optimizer tunnel 105 between the requesting CPE 260 and the content server 150 via a respective client optimizer 120 and server optimizer 130.

In some embodiments, the data representing the live content movie request (i.e., the movie) is communicated to the first viewer over a first content stream (e.g., a unicast channel (e.g., by private IP). For example, as described above, blocks of data are received at the server optimizer 130 and fingerprints are generated. The fingerprints are used to determine that the data is not in the first viewer's client dictionary, the data is not part of a currently active shared content stream or other multicast stream, and the data should not be multicast for some other reason. In other embodiments, the data is multicast to the first viewer, even though the content is not part of a current shared content stream.

At a second time 910b (e.g., twenty minutes into the first viewer's download of the streaming movie), a second viewer requests the same content. As content is received in response to the request, the server optimizer 130 intercepts the content and generates fingerprints of the content. The server optimizer 130 determines, as a function of the fingerprints, that the content is already being communicated to the first viewer. For example, the fingerprints match blocks in the global stream model 542 of FIG. 5. Notably, at this point, the respective entries in the global stream model 542 may not be part of any shared content stream and may carry a client stream ID for the first viewer, rather than a Content Stream ID (e.g., the blocks are described above as being unicast as part of a particular client session stream). For the sake of clarity, it is assumed that the content has not been previously stored in the second viewer's client dictionary as a result of a different transaction (e.g., a pre-positioning multicast session, etc.).

When it is determined that the content being requested by the second viewer is substantially the same content already being communicated to the first viewer, the server optimizer 130 may switch into overlapping request mode for that content, as described with reference to FIGS. 6, 7, 8A, and 8B. For example, as described above, the content data may be tagged with a unique Content Stream ID, a global stream model 542, and/or client stream models 544, and/or client dictionary models 548 may be updated, etc. As described with reference to block 860 of FIG. 8B, above, some of the content on the shared content stream will be shared content, and other content will be unshared content.

Substantially after the request is received and processed (e.g., shortly after the second time 910b), the second viewer begins receiving the shared content as part of the shared content stream and begins receiving the unshared content as part of a second stream. For example, say the first viewer is twenty minutes into streaming a two-hour movie at the time the second viewer's request is processed. The second viewer may begin streaming the first twenty minutes of the movie (i.e., that have already been streamed by the first viewer prior to the second viewer's request) via a second session stream. Substantially in parallel, the remaining portion of the movie may be multicast to the first and second viewers as shared content on the shared content stream. As the shared content is received, it may be viewed as part of the streaming movie by the first viewer, and it may be stored anticipatorily by the second viewer in the second viewer's client dictionary.

It is worth noting that, in some cases, a switch into overlapping request mode may involve switching content from one service flow to another. For example, content that was previously being communicated on a unicast service flow (e.g., or even possibly on a multicast service flow) may be switched to a new shared content stream (e.g., multicast service flow) and the previously active service flow may be terminated. It will be appreciated that where a viewer is switched from one service flow to another (e.g., from a unicast service flow to a multicast service flow), various techniques may be used. In certain embodiments, the live content data may be redundantly communicated on both service flows for a period of time during the transition. This may account for various latencies, processing times, buffering times, etc. For example, the user systems 110 may be configured to maintain a 15-second buffer to account for changes in link conditions, dropped packets, etc. During the transition to a multicast stream, some embodiments exploit the buffer to reduce the amount of redundant communications needed (e.g., the buffered data may be used if there is a short break in the transmission during the switch between service flows); while other embodiments use the new stream to ensure that the buffer is full before dropping the old stream.

At a third time 910c (e.g., twenty minutes into the second viewer's download of the streaming movie, which may be approximately forty minutes into the first viewer's download of the streaming movie), the method 900 may determine that the next blocks of data being downloaded by the second viewer as part of the streaming movie are already stored in the second viewer's client dictionary. For example, these blocks are the blocks that are being received and stored anticipatorily from the shared content stream. At this point, the second viewer may begin receiving the blocks in a highly compressed form, and may be decompressed and viewed using the locally stored data from the client dictionary.

If the shared session stream is still active (e.g., if the first viewer is still in the process of streaming the remainder of the movie), the second viewer may continue to anticipatorily store shared content in the client dictionary while using previously stored blocks from the dictionary for decompression as needed. For example, at the third time 910c, the second viewer may be twenty minutes into the movie and the first viewer may be forty minutes into the movie. As the second viewer decompresses the second twenty minutes of the movie that have been stored since the shared stream began, the second viewer may also continue to anticipatorily download and store the remaining hour and twenty minutes of the movie being streamed by the first viewer as shared content.

At a fourth time 910d, the first viewer's streaming of the movie ends, and the first viewer leaves the shared content stream. At this point, the second viewer may have anticipatorily stored the entire remainder of the movie, and may be able to use that locally stored data to receive and decompress a highly compressed version of the remainder of the movie. The second viewer's streaming of the movie may end at a fifth time 910e.

It is worth noting that the stream management described in FIG. 9 may be completely transparent to the viewers. For example, from the perspective of the second viewer, the movie may be accessed, downloaded, watched, etc. with little or no awareness by the second viewer of the stream sharing, compression, and or other techniques involved in handling the overlapping requests. Using these techniques, including the use of fingerprinting and/or other deltacasting techniques, to handle shared content streams may provide a number of features. One feature is that shared content stream deltacasting opportunities may be identified and/or exploited even where there is little or no access to certain metadata. For example, as discussed above, the server optimizer generates signatures based on byte level data and does not require knowledge of "header portion" information (e.g., file types, proprietary tags, protocol tags, etc.) to make its determinations.

Another feature is that fingerprinting techniques may allow deltacasting opportunities to be identified, even where the content source or other "header portion" (e.g., metadata) information is different. For example, suppose that viewers are watching the same television show at the same time from different sources (e.g., different television channels are broadcasting the same content, different websites are mirroring the same content, etc.). Fingerprinting techniques can find matching blocks, as the blocks will match even where the content sources are different. Similarly, deltacasting opportunities may be identified even where cache-busting techniques are used to alter URLs, where content data networks (CDNs) are used to mirror and/or re-locate content, etc.

Still another feature is that fingerprinting techniques may allow deltacasting opportunities to be identified, even where the content timing among clients is mismatched or inconsistent. For example, as described above, clients may request content in overlapping ways, or even asynchronously, out of order, with different jitter windows, etc. In all these and other cases, it may be insufficient to merely look for the same content going to multiple clients at the same time. Fingerprinting techniques can find and exploit matching blocks, even where these mismatches or inconsistencies are present.

It is also worth noting that that embodiments allow substantially transparent optimization of communications while preserving certain legal and business relationships, including, copyright, digital rights management, subscription, and/or other obligations. For example, as discussed above, content data is stored in dictionaries as dissociated blocks of data, such that the content can only be recreated from those blocks using appropriate dictionary references (e.g., indexes).

According to various embodiments, those dictionary references are unavailable to clients without a new request from the content source.

In one illustrative embodiment, a block of file data is requested by a user as part of a download of a movie. The movie includes copyrighted material and is provided by a host requiring a valid user ID and password for authentication. When the user requests the file data, the deltacasting optimizations may be substantially transparent to the user, such that the user still logs into the host and requests the file data from the host. As such, even if the requested block of file data is determined (e.g., using deltacasting techniques) to be locally stored in the user's client dictionary, accessing that local data may still involve compliance with copyright and authentication obligations.

The above description is intended to provide various embodiments of the invention, but does not represent an exhaustive list of all embodiments. For example, those of skill in the art will appreciate that various modifications are available within the scope of the invention. Further, while the disclosure includes various sections and headings, the sections and headings are not intended to limit the scope of any embodiment of the invention. Rather, disclosure presented under one heading may inform disclosure presented under a different heading. For example, descriptions of embodiments of method steps for handling overlapping content requests may be used to inform embodiments of methods for handling anticipatory requests.

Specific details are given in the above description to provide a thorough understanding of the embodiments. However, it is understood that the embodiments may be practiced without these specific details. For example, well-known processes, algorithms, structures, and techniques may be shown without unnecessary detail in order to avoid obscuring the embodiments. Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field-programmable gate arrays (FPGAs), soft core processors, hard core processors, controllers, micro-controllers, microprocessors, other electronic units designed to perform the functions described above, and/or a combination thereof. Software can be used instead of or in addition to hardware to perform the techniques, blocks, steps, and means.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. Similarly, terms like "cache" are intended to broadly include any type of storage, including temporary or persistent storage, queues (e.g., FIFO, LIFO, etc.), buffers (e.g., circular, etc.), etc. The term "machine-readable medium" includes, but is not limited to, portable or fixed storage devices, optical storage devices, wireless channels, and/or various other storage mediums capable of storing that contain or carry instruction(s) and/or data.

Further, certain portions of embodiments (e.g., method steps) are described as being implemented "as a function of" other portions of embodiments. This and similar phraseologies, as used herein, intend broadly to include any technique for determining one element partially or completely according to another element. For example, a method may include generating a fingerprint from a first request and generating a determination "as a function of" the fingerprint. In various embodiments, the determination may be made in any way, so long as the outcome of the determination generation step is at least partially dependant on the outcome of the fingerprint generation step.

While the principles of the disclosure have been described above in connection with specific apparatuses and methods, it is to be clearly understood that this description is made only by way of example and not as limitation on the scope of the disclosure.

What is claimed is:

1. A method for multicasting over a communications system having a server side and a plurality of clients in communication over a shared communications infrastructure, the method comprising:
   receiving a content request at the server side from a first client over the communications infrastructure;

communicating content data blocks invoked by the content request to the first client via a first content stream over the communications infrastructure in response to the content request;

determining, by the server side according to a global stream model, whether the content request matches at least an elapsed portion of a second content stream being communicated to a second client, the global stream model maintaining models of active session streams being communicated over the communications infrastructure, and the second content stream being one of the active session streams, having the elapsed portion already communicated to the second client, and having a remaining portion not yet communicated to the second client; and multicasting, when the content request matches the elapsed portion of the content stream, at least some of the remaining portion of the second content stream from the server side to the first and second clients over the communications infrastructure concurrently with communicating the content data blocks to the first client over the first client session stream.

2. The method of claim 1, wherein the communicating comprises unicasting.

3. The method of claim 1, wherein the communicating comprises, for each content data block:

determining, by the server side, whether the content data block is presently stored in a local cache of the first client;

unicasting an uncompressed instance of the content data block to the first client when the content data block is not presently stored in the local cache of the first client; and unicasting a compressed instance of the content data block to the first client when the content data block is presently stored in the local cache of the first client.

4. The method of claim 3, wherein the determining whether the content data block is presently stored in the local cache is performed according to a client cache model maintained by the server side.

5. The method of claim 1, wherein:

the content request indicates a destination address;

the receiving is in response to the first client having redirected the content request from the destination address to the server side; and the method further comprises, prior to the communicating:

forwarding the content request to the destination address; and receiving the content data blocks invoked by the content request from the destination address.

6. The method of claim 1, wherein the determining comprises, for each content data blocks invoked by the content request:

generating a fingerprint using byte-level information comprised by a content portion of the content data block; and using the fingerprint to determine whether the content data blocks matches byte-level information comprised by the elapsed portion of the content stream communicated to the second client over the second client session stream according to the global stream model.

7. The method of claim 1, wherein the multicasting comprises:

converting the remaining portion of the second content stream into a shared content stream; and directing at least the first and second clients to join the shared content stream.

8. A server-side system for multicasting over a communications system in which the server-side system is in communication with a plurality of clients over a shared communications infrastructure, the system comprising:

a server optimization module configured to receive a content request from a first client-side system over the communications infrastructure;

a modeling module configured to determine, according to a global stream model, whether the content request matches at least an elapsed portion of a second content stream being communicated to a second client-side system, the global stream model maintaining models of active session streams being communicated over the communications infrastructure, and the second content stream being one of the active session streams, having the elapsed portion already communicated to the second client-side system, and having a remaining portion not yet communicated to the second client-side system; and a stream management module, communicatively coupled with the server optimization module and the modeling module, and configured to:

communicate content data blocks invoked by the content request to the first client-side system via a first content stream over the communications infrastructure in response to the content request; and multicast, when the content request matches the elapsed portion of the content stream, at least some of the remaining portion of the second content stream to the first and second client-side systems over the communications infrastructure concurrently with communication the content data blocks to the first client-side system over the first client session stream.

9. The system of claim 8, wherein the stream management module is configured to communicate the first content stream to the first client-side system by:

determining whether the content data block is presently stored in a local cache of the first client-side system;

unicasting an uncompressed instance of the content data block to the first client-side system when the content data block is not presently stored in the local cache; and unicasting a compressed instance of the content data block to the first client-side system when the content data block is presently stored in the local cache.

10. A method for multicasting over a communications system having a server side and a plurality of clients in communication over a shared communications infrastructure, the method comprising:

directing a content request from a first client to the server side over the communications infrastructure;

first receiving, at the first client in response to the content request, a client session stream comprising a first portion of a content stream invoked by the content request;

second receiving, at the first client from the server side during the first receiving, a multicast session stream comprising a second portion of the content stream, the multicast session stream received in response to a determination by the server side that the content request matches an elapsed portion of an active session stream being communicated to a second client, the determination being according to a global stream model that maintains models of active session streams being communicated over the communications infrastructure, the active session stream having the elapsed portion already communicated to the second client and a remaining portion not yet communicated to the second client, and the second portion corresponding to at least part of the remaining portion of the second content stream;

displaying the first portion of the content stream from the received client session stream to a customer premises device of the first client; and storing the second portion of the content stream from the received multicast session stream in a local cache of the first client.

11. The method of claim 10, wherein the client session stream is a unicast communication.

12. The method of claim 10, wherein the displaying is performed substantially as the client session stream is received.

13. The method of claim 10, wherein the storing is performed substantially as the multicast session stream is received.

14. The method of claim 10, wherein:
the client session stream comprises a plurality of content data blocks invoked by the content request; and
the first receiving comprises:
receiving an uncompressed instance of each content data block for which there is a determination by the server side that the content data block is not presently stored in the local cache of the first client; and
receiving a compressed instance of each content data block for which there is a determination by the server side that the content data block is presently stored in the local cache.

15. The method of claim 14, further comprising:
retrieving, by the first client for each received compressed instance, a corresponding uncompressed instance of the content data block from the local cache; and
displaying the uncompressed instance of the content data block to the customer premises device.

16. The method of claim 10, further comprising:
after storing the second portion of the content stream, communicating verification from the first client to the server side of successful receipt of the second portion by the first client.

17. The method of claim 10, wherein the first receiving is from the server side.

18. A client-side system in a communications system having a server-side system and a plurality of client-side systems in communication over a shared communications infrastructure, the method comprising:

a redirector configured to direct a content request to the server-side system over the communications infrastructure;

a client optimizer configured to:
first receive, in response to the content request, a client session stream comprising a first portion of a content stream invoked by the content request;
second receive, from the server-side system during the first receiving, a multicast session stream comprising a second portion of the content stream, the multicast session stream received in response to a determination by the server-side system that the content request matches an elapsed portion of an active session stream being communicated to a second client-side system, wherein:
the determination is according to a global stream model that maintains models of active session streams being communicated over the communications infrastructure,
the active session stream has the elapsed portion already communicated to the second client-side system and a remaining portion not yet communicated to the second client-side system, and
the second portion corresponds to at least part of the remaining portion of the second content stream;
display the first portion of the content stream from the received client session stream to a user system in communication with the client optimizer; and
store the second portion of the content stream from the received multicast session stream in a local cache in communication with the client optimizer.

19. The system of claim 18, wherein:
the client session stream comprises a plurality of content data blocks invoked by the content request; and
the client optimizer is configured to first receive by:
receiving an uncompressed instance of each content data block for which there is a determination by the server side that the content data block is not presently stored in the local cache; and
receiving a compressed instance of each content data block for which there is a determination by the server side that the content data block is presently stored in the local cache.

20. The system of claim 19, wherein the client optimizer is further configured to:
retrieve, for each received compressed instance, a corresponding uncompressed instance of the content data block from the local cache; and
display the uncompressed instance of the content data block to the user system.

* * * * *